(12) United States Patent
Aoki et al.

(10) Patent No.: US 12,348,910 B2
(45) Date of Patent: Jul. 1, 2025

(54) GROUND SYSTEM AND IMAGE PROCESSING METHOD

(71) Applicant: SONY GROUP CORPORATION, Tokyo (JP)

(72) Inventors: Suguru Aoki, Tokyo (JP); Ryuta Satoh, Tokyo (JP); Itaru Shimizu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 83 days.

(21) Appl. No.: 18/257,532

(22) PCT Filed: Dec. 9, 2021

(86) PCT No.: PCT/JP2021/045250
§ 371 (c)(1),
(2) Date: Jun. 14, 2023

(87) PCT Pub. No.: WO2022/138181
PCT Pub. Date: Jun. 30, 2022

(65) Prior Publication Data
US 2024/0048671 A1 Feb. 8, 2024

(30) Foreign Application Priority Data
Dec. 23, 2020 (JP) ................................ 2020-213125

(51) Int. Cl.
G06V 20/13 (2022.01)
G06V 10/40 (2022.01)
H04N 7/18 (2006.01)

(52) U.S. Cl.
CPC ............ *H04N 7/183* (2013.01); *G06V 10/40* (2022.01); *G06V 20/13* (2022.01)

(58) Field of Classification Search
CPC ......... H04N 7/183; G06V 10/40; G06V 20/13
USPC ........................................................ 348/144
See application file for complete search history.

(56) References Cited

U.S. PATENT DOCUMENTS

| 2010/0115519 | A1  |   | 5/2010  | Chechik et al. |
|---|---|---|---|---|
| 2020/0322703 | A1 | * | 10/2020 | Bures ....................... G06F 16/27 |
| 2021/0311203 | A1 | * | 10/2021 | Reis ........................ G01S 19/21 |
| 2021/0344421 | A1 | * | 11/2021 | Ohta ..................... H04L 1/0071 |
| 2024/0283530 | A1 | * | 8/2024  | Miller ................. H04B 7/18541 |

FOREIGN PATENT DOCUMENTS

| CN | 105900352 B | * | 2/2019 | ............... H04B 7/14 |
|---|---|---|---|---|
| EP | 2962943 A1 | * | 1/2016 | ............ B64G 1/1021 |
| JP | 5-061963 A |  | 3/1993 | |

(Continued)

OTHER PUBLICATIONS

International Search Report and Written Opinion of PCT Application No. PCT/JP2021/045250, issued on Feb. 15, 2022, 11 pages of ISRWO.

*Primary Examiner* — Behrooz M Senfi
(74) *Attorney, Agent, or Firm* — CHIP LAW GROUP

(57) ABSTRACT

Provided is an image processing method to efficiently acquire data from an artificial satellite. A ground system includes an image processing unit that requests transmission of additional data related to partial data from an artificial satellite to a ground station, on the basis of an analysis result of the partial data of a satellite image captured by the artificial satellite.

13 Claims, 31 Drawing Sheets

(56) References Cited

FOREIGN PATENT DOCUMENTS

| | | | |
|---|---|---|---|
| JP | 2000194833 A * | 7/2000 | |
| JP | 2004272712 A * | 9/2004 | ......... H04N 21/4312 |
| JP | 2006-523836 A | 10/2006 | |
| JP | 2007-073055 A | 3/2007 | |
| JP | 2009-009436 A | 1/2009 | |
| JP | 2013-084072 A | 5/2013 | |
| JP | 2013-145507 A | 7/2013 | |
| JP | 2019-149782 A | 9/2019 | |
| WO | WO-2004001659 A1 * | 12/2003 | ........... G06T 3/4053 |
| WO | 2020/250709 A1 | 12/2020 | |

* cited by examiner

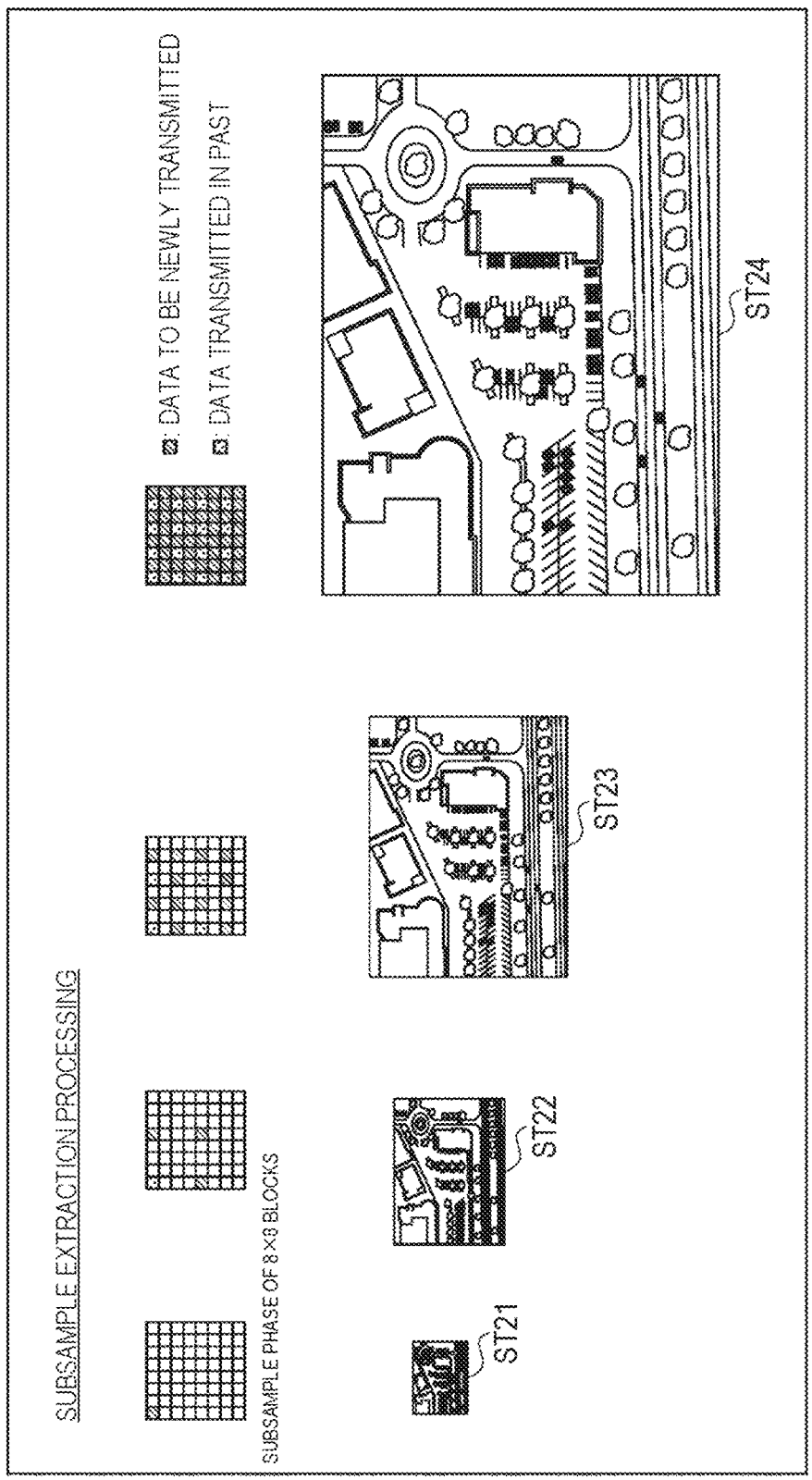

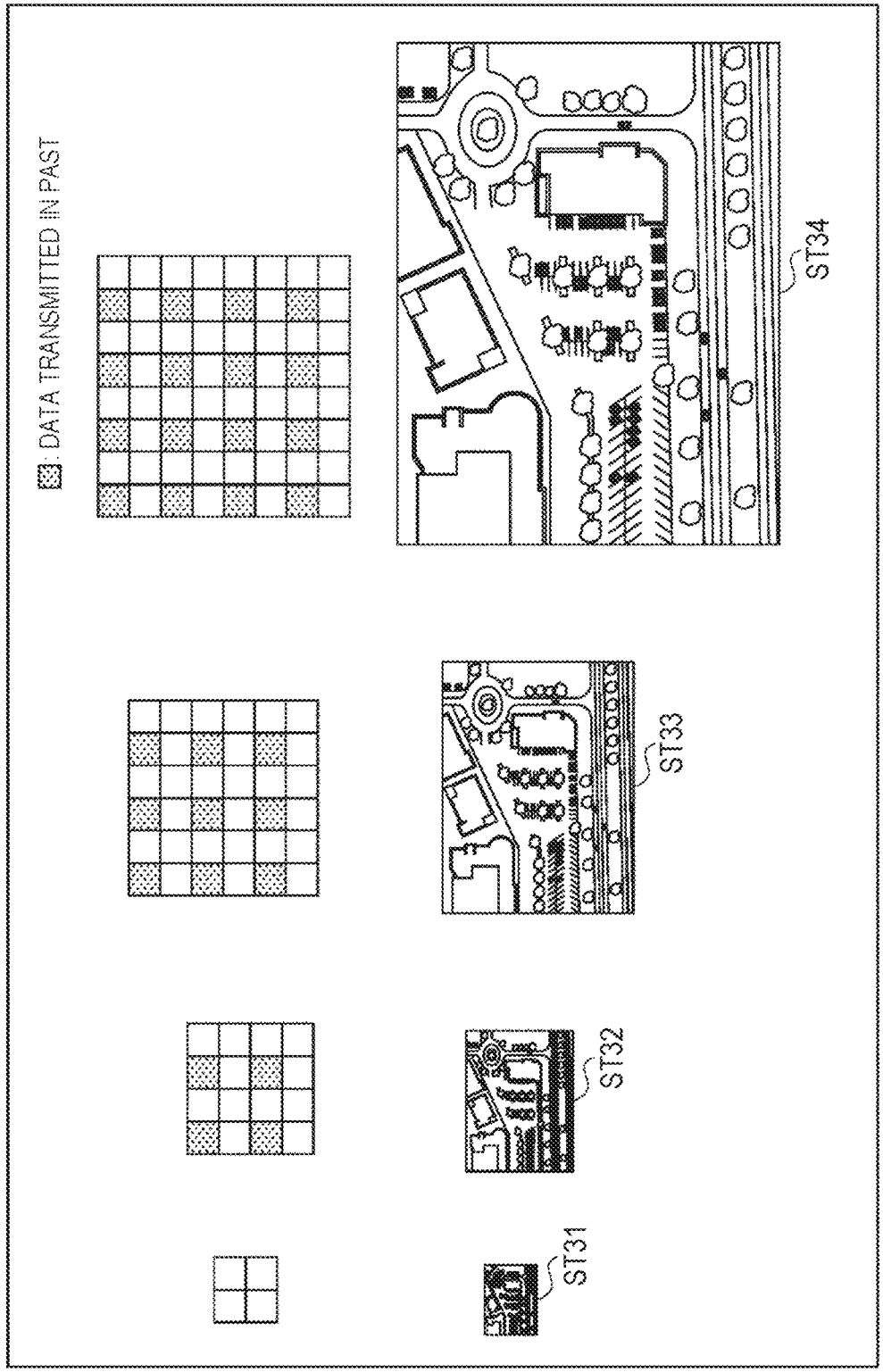

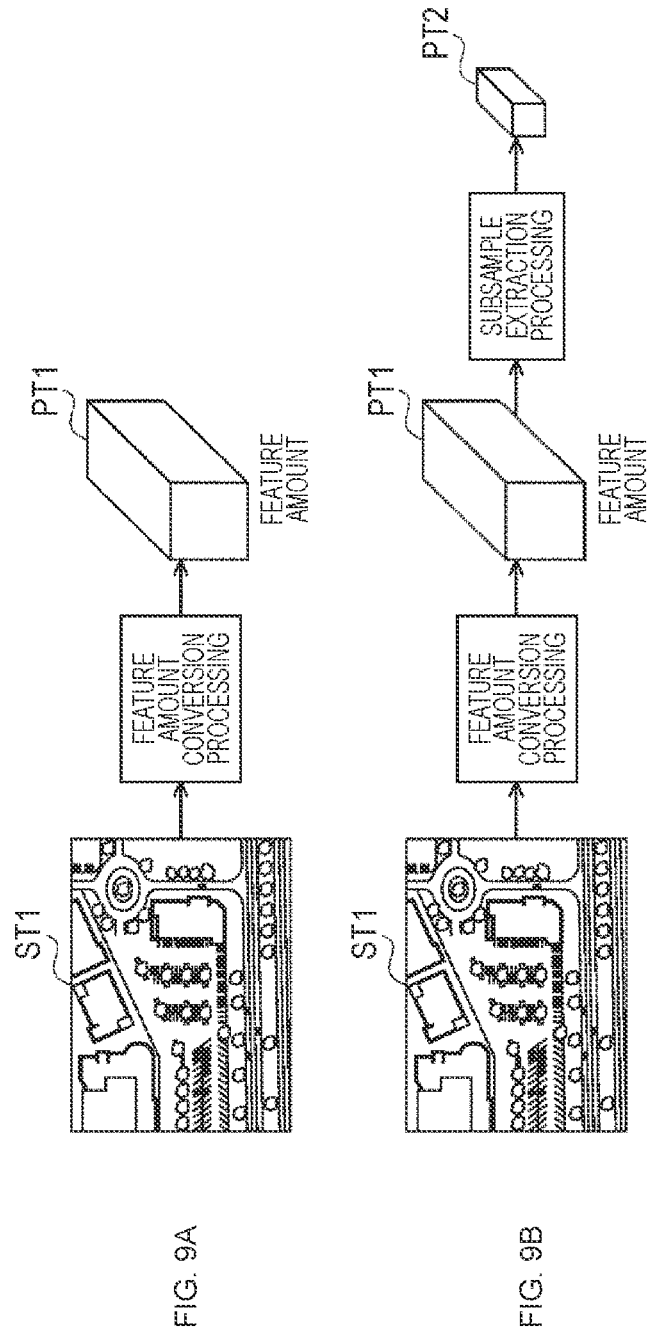

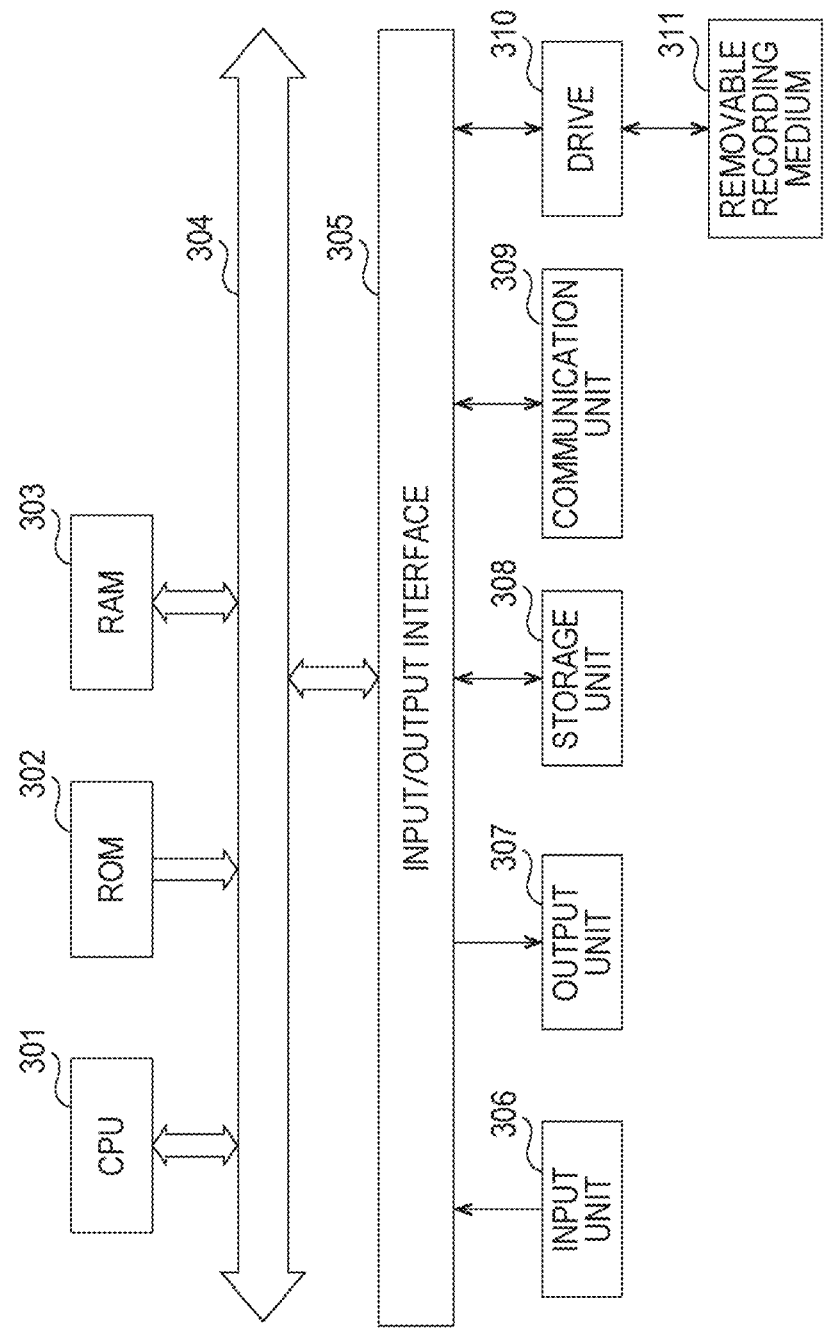

GROUND SYSTEM AND IMAGE PROCESSING METHOD

CROSS REFERENCE TO RELATED APPLICATIONS

This application is a U.S. National Phase of International Patent Application No. PCT/JP2021/045250 filed on Dec. 9, 2021, which claims priority benefit of Japanese Patent Application No. JP 2020-213125 filed in the Japan Patent Office on Dec. 23, 2020. Each of the above-referenced applications is hereby incorporated herein by reference in its entirety.

TECHNICAL FIELD

The present technology relates to a ground system and an image processing method thereof, and more particularly to a ground system and an image processing method thereof capable of efficiently acquiring data from an artificial satellite.

BACKGROUND ART

There has been widespread use of remote sensing for observing a status of crops, a status of the ocean, and the like on the basis of an image-capturing result, by capturing an image of a predetermined point on the ground with a camera mounted on an artificial satellite that orbits in the sky above the earth in a low orbit or a medium orbit (see, for example, Patent Documents 1 and 2). In recent years, performance of an artificial satellite has been improved, and a higher-quality image has been able to be obtained. Along with this, a data amount of the image has been increased.

CITATION LIST

Patent Document

Patent Document 1: Japanese Patent Application Laid-Open No. 2013-145507
Patent Document 2: Japanese Patent Application Laid-Open No. 2013-84072

SUMMARY OF THE INVENTION

Problems to be Solved by the Invention

However, communication of an artificial satellite with a ground station (a base station on the ground) is limited to several minutes to several tens of minutes while the artificial satellite is passing in the sky above the ground station. Therefore, in a case where a large amount of data is downlinked, there is a case where the downlink cannot be completed due to a shortage of a communication time or a communication band.

The present technology has been made in view of such a situation, and is intended to enable efficient acquisition of data from an artificial satellite.

Solutions to Problems

A ground system according to one aspect of the present technology includes: an image processing unit that requests transmission of additional data related to partial data from an artificial satellite to a ground station, on the basis of an analysis result of the partial data of a satellite image captured by the artificial satellite.

In an image processing method of a ground system according to one aspect of the present technology, the ground system requests transmission of additional data related to partial data from an artificial satellite to a ground station, on the basis of an analysis result of the partial data of a satellite image captured by the artificial satellite.

In one aspect of the present technology, in a ground system, transmission of additional data related to partial data from an artificial satellite to a ground station is requested on the basis of an analysis result of the partial data of a satellite image captured by the artificial satellite.

The ground system may be an independent device, may be an internal block constituting one device, or may be configured with a plurality of devices.

BRIEF DESCRIPTION OF DRAWINGS

FIG. 7 is a view illustrating an example of partial data generated by subsample extraction processing.
FIG. 8 is a view illustrating an example of a low-resolution image as a comparative example.
FIGS. 9A and 9B are diagrams illustrating another example of the partial data generation processing.

FIG. 32 is a block diagram illustrating a configuration example of an embodiment of a computer to which the present technology is applied.

MODE FOR CARRYING OUT THE INVENTION

Figure 1:
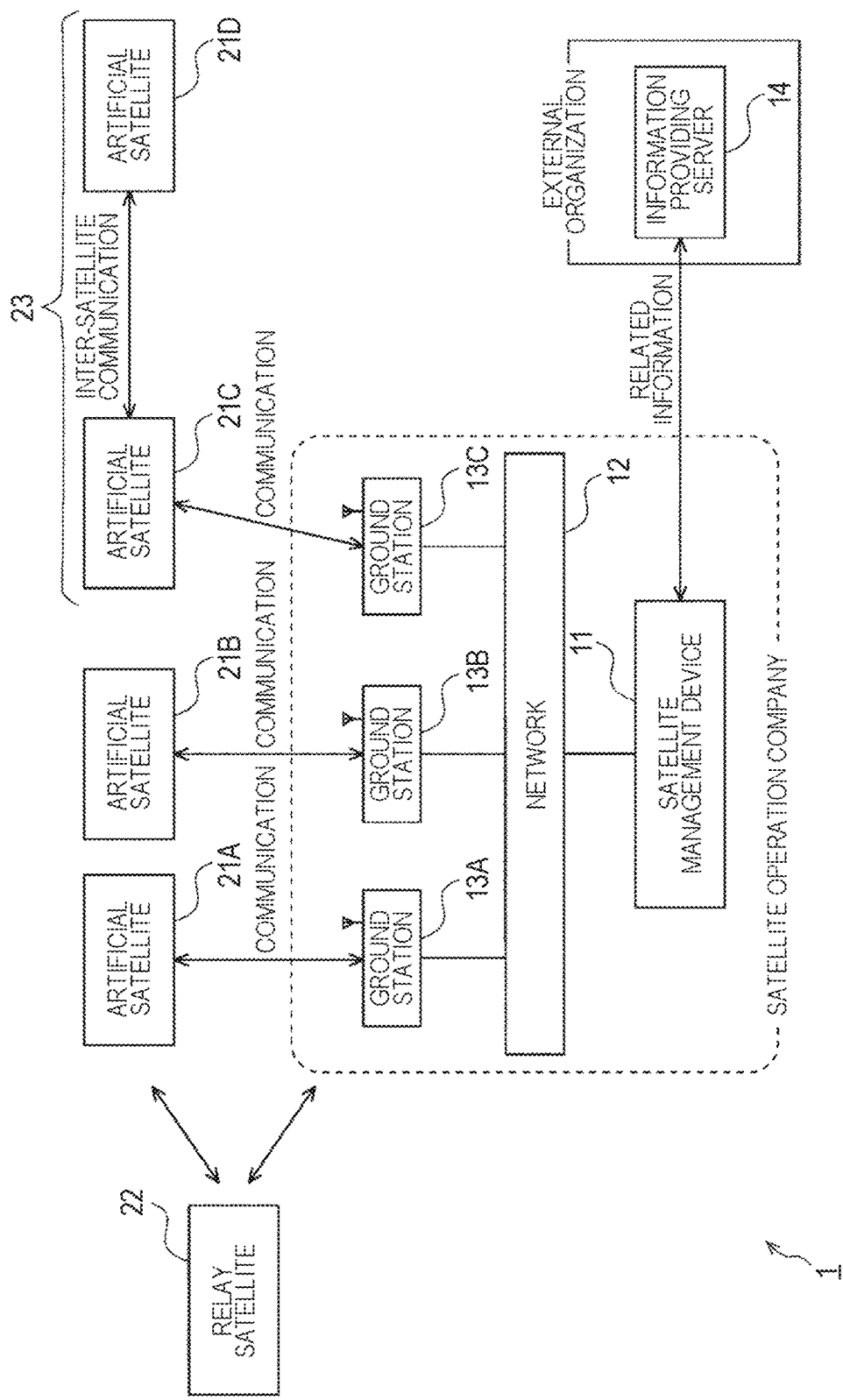
FIG. 1 is a block diagram illustrating a configuration example of a satellite image processing system according to an embodiment to which the present technology is applied.

Hereinafter, an embodiment for implementing the present technology (hereinafter, referred to as an embodiment) will be described with reference to the accompanying drawings. Note that, in the present specification and the drawings, components having substantially the same functional configuration are denoted by the same reference numerals, and redundant explanations are omitted. The description will be made in the following order.
 1. Configuration example of satellite image processing system
 2. Basic sequence of satellite image acquisition
 3. First satellite data transmission processing
 4. Functional block diagram of ground station and satellite
 5. Second satellite data transmission processing
 6. Third satellite data transmission processing
 7. Recognition processing of subsampled image
 8. Computer configuration example <1. Configuration Example of Satellite Image Processing System>

FIG. 1 is a block diagram illustrating a configuration example of a satellite image processing system according to an embodiment to which the present technology is applied.

A satellite image processing system 1 in FIG. 1 is a system that analyzes a status on the ground on the basis of satellite images captured by one or more artificial satellites 21 (hereinafter, simply referred to as satellites 21). In the present embodiment, the satellite 21 is an earth observation satellite, and has at least a function of capturing an image of the ground with a mounted camera.

A satellite operation company has a satellite management device 11 that manages a plurality of satellites 21, and a plurality of ground stations (base stations on the ground) 13 that communicates with the satellites 21. Note that some of the satellite management device 11 and the plurality of ground stations 13 may be devices owned by a company other than the satellite operation company. The satellite management device 11 and the plurality of ground stations 13 are connected via a predetermined network 12. FIG. 1 illustrates an example in which the number of ground stations 13 is three of ground stations 13A to 13C, but the number of ground stations 13 may be freely determined.

The satellite management device 11 manages the plurality of satellites 21 owned by the satellite operation company. Specifically, the satellite management device 11 acquires related information from an information providing server 14 of one or more external organizations as necessary, and determines an operation plan for the plurality of satellites 21 owned by the self. Then, the satellite management device 11 transmits an image-capturing instruction to a predetermined satellite 21 via the ground station 13 in response to a request of a customer, to cause the predetermined satellite 21 to capture an image. Furthermore, the satellite management device 11 acquires, and displays or stores a satellite image transmitted from the satellite 21 via the ground station 13.

The satellite management device 11 can also perform predetermined image processing on a satellite image captured by the satellite 21. The satellite management device 11 performs, for example, the following image processing.

(1) Generation of Metadata

Metadata can be generated on the basis of information transmitted from the satellite 21 or information about the satellite 21 that has captured the image. For example, information about latitude and longitude of an image-capturing target position, information about attitude control and acceleration at the time of image-capturing by the satellite 21, and the like can be generated as the metadata.

(2) Correction Processing of Satellite Image

Correction processing can be performed, such as radiometric correction regarding sensitivity characteristics, geometric correction of an orbital position, an attitude error, and the like of the satellite 21, ortho-correction for correcting geometric distortion caused by a height difference of terrain, and map projection of performing image projection onto a map projection surface.

(3) Color Synthesis Processing

Color synthesis processing can be performed, such as pan-sharpening processing, true-color synthesis processing, false color synthesis processing, natural color synthesis processing, SAR image synthesis processing, and processing of adding a color to a satellite image for each band.

(4) Other Image Synthesis

It is also possible to perform synthesis with a satellite image captured in the past by the satellite 21 owned by the satellite operation company, a satellite image captured by the satellite 21 owned by another satellite operation company, and some other images, synthesis between satellite images captured in different bands, synthesis with map information, and the like.

(5) Information Extraction

It is possible to calculate vegetation detection information such as a normalized difference vegetation index (NDVI) and water detection information such as a normalized difference water index (NDWI), with different bands such as red (R) and infrared (IR). It is possible to perform highlight processing of a specific subject such as a vehicle, a mobile object, or a fish group, extraction of information on a specific band, a change point from previous image-capturing, and the like.

(6) Resolution Enhancement or Quality Enhancement Processing

By superimposing a plurality of satellite images, it is possible to generate a satellite image with improved resolution. Furthermore, it is possible to generate a pansharped image obtained by combining a monochrome image and a color image, and a high-resolution satellite image by synthesizing satellite images with different image-capturing conditions such as, for example, different dynamic ranges or shutter speeds, different bands (wavelength bands), or different resolutions.

(7) Three-Dimensional Measurement

Three-dimensional information can be obtained from a parallax image. Furthermore, accuracy of object recognition on the ground can be enhanced by the three-dimensional information. For example, it is possible to discriminate whether or not an object is a vehicle (even if it is not immediately recognized as a vehicle from the image in terms of resolving power, it can be estimated as a vehicle if the object on the road is not a pattern and is recognized as a three-dimensional object).

(8) Difference Measurement

A change between a first time and a second time can be extracted using a plurality of satellite images captured from the same position with a time difference. Furthermore, imaging may be performed such that only a changed target is extracted and colored. Furthermore, for example, a moving speed of a ship or a vehicle can be calculated using a plurality of satellite images, or a wind speed can be calculated from movement of cloud or the like.

Note that image processing of the satellite image may be performed by an image analysis company different from the satellite operation company. In this case, the satellite image to be analyzed is provided to a server (an image analysis server) of the image analysis company. Furthermore, even in a case where the satellite operation company performs image processing of the satellite image, the image analysis server may be provided separately from the satellite management device 11, and the image analysis server may analyze the image.

The network 12 is any communication network, and may be a wired communication network or a wireless communication network, or may be configured with both of them. The network 12 may be a communication network or a communication path of any communication standard such as, for example, the Internet, a public telephone network, a wide-area communication network for a wireless mobile object such as a so-called 4G line or 5G line, a wide area network (WAN), a local area network (LAN), a wireless communication network that performs communication conforming to the Bluetooth (registered trademark) standard, a communication path for short-range wireless communication such as near field communication (NFC), a communication path for infrared communication, and a communication network of wired communication conforming to a standard such as high-definition multimedia interface (HDMI (registered trademark)) or universal serial bus (USB). The network 12 may include one communication network, or may include a plurality of communication networks.

Under the control of the satellite management device 11, the ground station 13 communicates with a predetermined satellite 21 designated by the satellite management device 11, via an antenna. For example, the ground station 13 transmits an image-capturing instruction for capturing an image of a predetermined place (area) on the ground, to a predetermined satellite 21. Furthermore, the ground station 13 receives a satellite image transmitted from the satellite 21, and supplies the satellite image to the satellite management device 11 via the network 12. Transmission from the ground station 13 to the satellite 21 is also referred to as uplink, and transmission from the satellite 21 to the ground station 13 is also referred to as downlink. The ground station 13 can directly communicate with the satellite 21, and can also communicate via a relay satellite 22. As the relay satellite 22, for example, a geostationary satellite is used.

The information providing server 14 installed in an external organization supplies predetermined related information to the satellite management device 11, in response to a request from the satellite management device 11 or periodically via a predetermined network. The related information provided from the information providing server 14 includes, for example, the following. For example, orbit information of a satellite described in a two-line elements (TLE) format (hereinafter, referred to as TLE information) can be acquired as related information from North American Air and Space Defense Command (NORAD) as an external organization. Furthermore, for example, it is possible to acquire weather information such as weather and cloud cover at a predetermined point on the earth, from a weather information providing company as an external organization.

A single satellite 21 may be operated and a plurality of satellites 21 may be operated. A plurality of the operated satellites 21 constitutes a satellite group 23. In FIG. 1, a satellite 21A and a satellite 21B are individually operated, and a satellite 21C and a satellite 21D constitute a satellite group 23A. Note that, in the example of FIG. 1, for the sake of simplicity, an example is illustrated in which one satellite group 23 includes two satellites 21, but the number of satellites 21 included in one satellite group 23 is not limited to two.

As a system that operates a plurality of satellites 21 as one unit (the satellite group 23), there are a constellation system and a formation flight system. The constellation system is a system in which a large number of satellites 21 are provided to a single orbital plane or a plurality of orbital planes to uniformly deploy a service mainly around the entire sphere. Even a single satellite has a predetermined function, and a plurality of the satellites 21 is operated for the purpose of improving an observation frequency and the like. Whereas, the formation flight system is a system in which a plurality of the satellites 21 is deployed in a narrow area of about several kilometers while maintaining a relative positional relationship. In the formation flight system, it is possible to provide services that cannot be realized by the single satellite, such as highly accurate three-dimensional measurement and speed detection for a mobile object. In the present embodiment, the satellite group may be operated in the constellation system or the formation flight system.

In a case where the ground station 13 communicates with each satellite 21, there are provided a method of directly communicating with the satellites 21 as in the satellite 21A and the satellite 21B, and a method of indirectly communicating with the ground station 13, as in the satellite 21D, by performing inter-satellite communication (inter-satellite optical communication) with the satellite 21C which is another satellite 21. The method of indirect communication also includes communication via the relay satellite 22. Which method is to be used by the satellite 21 for communication with the ground station 13 may be determined in advance in accordance with the satellite 21, or may be appropriately selected, in accordance with contents of communication.

In the satellite image processing system 1 configured as described above, the satellite 21, which is an observation satellite, captures an image of a predetermined point on the ground on the basis of an image-capturing instruction from the satellite management device 11. The captured satellite image is temporarily accumulated in the satellite 21, then transmitted to the ground station 13, and transferred to the sanitary management device 11.

<2. Basic Sequence of Satellite Image Acquisition>

Figure 2:
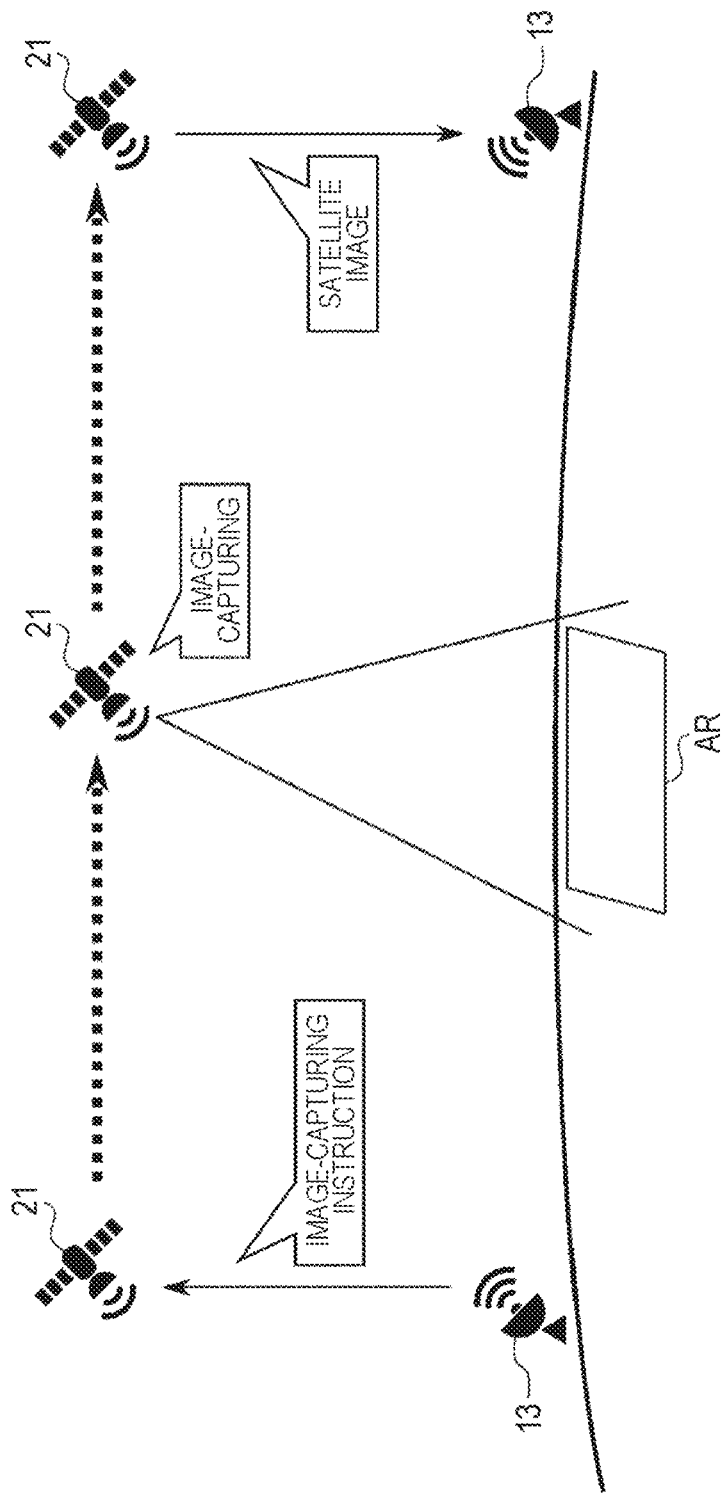
FIG. 2 is a schematic diagram for explaining a basic sequence for acquiring a satellite image.

FIG. 2 is a schematic diagram for explaining a basic sequence for acquiring a satellite image.

When passing in the sky above a predetermined ground station 13, the satellite 21 receives an image-capturing instruction from the ground station 13. The image-capturing instruction includes, for example, an image-capturing date and time, an image-capturing point, a camera setting value, and the like. In the example of FIG. 2, it is assumed that an image-capturing instruction for setting an area AR as an image-capturing target is transmitted.

The satellite 21 captures an image at an image-capturing point in the sky above the area AR on the basis of the image-capturing instruction. A satellite image including the area AR is generated by the image-capturing, and stored inside. Thereafter, when passing in the sky above a predetermined ground station 13, the satellite 21 transmits (downlinks) the stored satellite image to the ground station 13.

With reference to the flowchart of FIG. 3, the basic sequence illustrated in FIG. 2 will be described in more detail.

Figure 3:
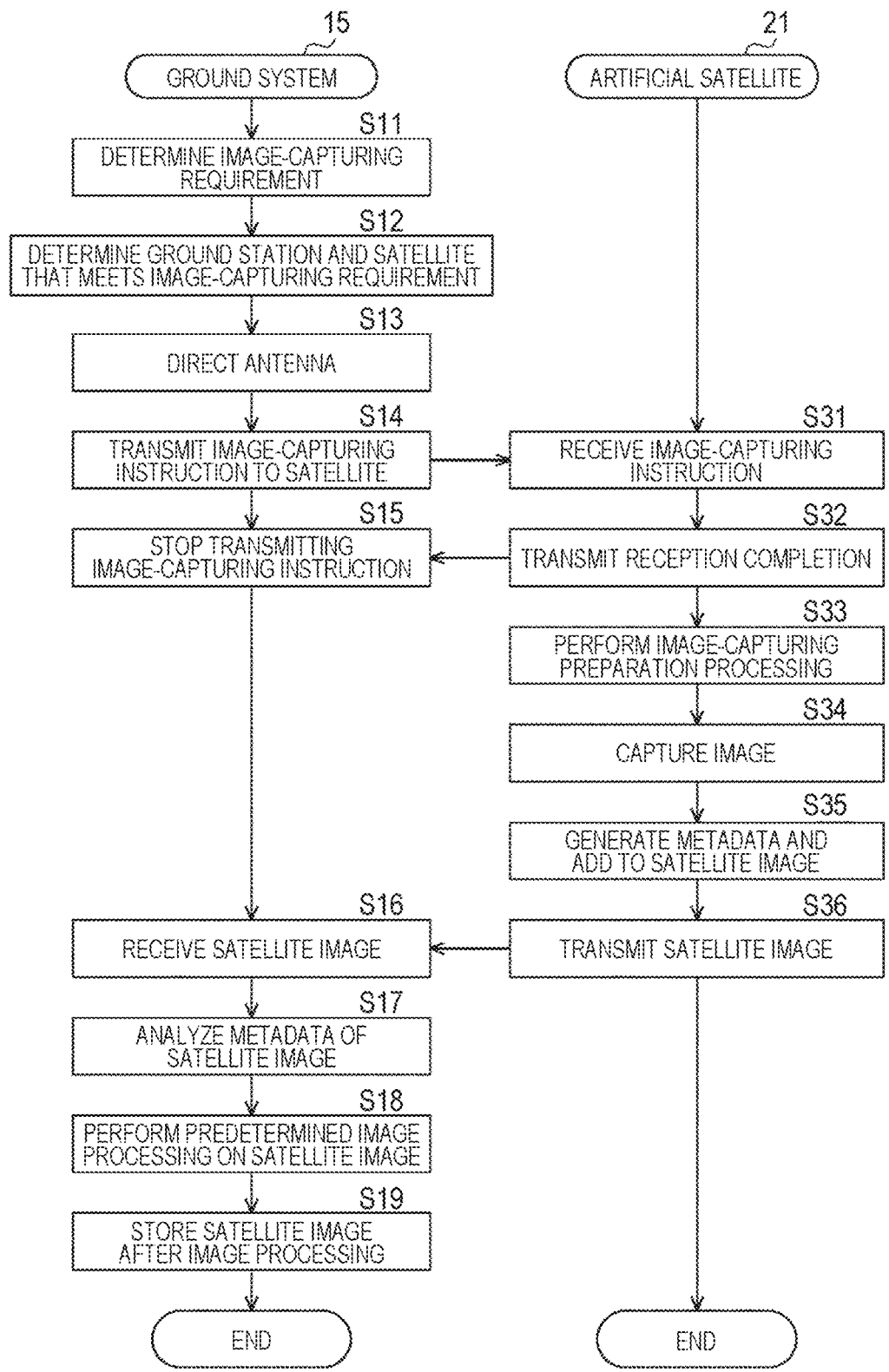
FIG. 3 is a flowchart for explaining a basic sequence for acquiring a satellite image.

Note that, in FIG. 3 and subsequent drawings, processing executed by the satellite management device 11 and the ground station 13 can be appropriately shared and executed between the satellite management device 11 and the ground station 13, and the satellite management device 11 and the ground station 13 are collectively referred to as a ground system 15.

First, in step S11, the satellite management device 11 determines an image-capturing requirement of the satellite 21 on the basis of a request of a customer.

Specifically, the satellite management device 11 determines, as the image-capturing requirement, an image-capturing date and time, an image-capturing point, environmental conditions for image-capturing, camera setting values, and the like. The environmental conditions for image-capturing include, for example, weather conditions such as cloud cover at the image-capturing date and time, and the camera setting values include, for example, a resolution (resolving power), zoom, a shutter speed, sensitivity, an aperture, and the like.

In step S12, the satellite management device 11 determines (the ground station 13 of) the ground station 13 and the satellite 21 that meets the image-capturing requirement.

Specifically, the satellite management device 11 selects the satellite 21 that meets the determined image-capturing requirements. For example, the satellite 21 is determined by determining whether the satellite 21 passes in the sky above an image-capturing target position at the determined image-capturing date and time, whether the image-capturing target position is within a range of an observation width of the satellite 21, whether an image-capturing device (a camera) mounted on the satellite 21 satisfies the determined requirement for the resolving power and the camera setting values, and the like. Then, the ground station 13 suitable for communicating with the selected satellite 21 is determined.

In step S13, the ground system 15 directs, to an assumed orbit, an antenna of the ground station 13 that is to transmit the image-capturing instruction. For example, the satellite management device 11 transmits orbit information of the selected satellite 21 to the ground station 13, and the ground station 13 directs the antenna to the assumed orbit.

In step S14, the ground system 15 transmits (uplinks) the image-capturing instruction to the selected satellite 21. For example, the satellite management device 11 transmits a command for transmitting the image-capturing instruction to the selected ground station 13, and the ground station 13 having received the command transmits the image-capturing instruction to the selected satellite 21 via the antenna. The image-capturing instruction includes an image-capturing date and time, an image-capturing point, a camera setting value, and the like.

The satellite 21 receives the image-capturing instruction from the ground station 13 in step S31, and transmits reception completion to the ground station 13 in step S32.

In step S15, the ground station 13 receives the reception completion from the satellite 21, and stops transmitting the image-capturing instruction. Transmission of the image-capturing instruction from the ground station 13 is repeatedly executed until there is a response of reception completion from the satellite 21.

In step S33, the satellite 21 performs image-capturing preparation processing based on the received image-capturing instruction. For example, the satellite 21 controls an attitude of the satellite 21 or an orientation (pointing) of the image-capturing device as necessary such that the image-capturing device faces the image-capturing target position. Furthermore, for example, the satellite 21 sets zoom, a shutter speed, sensitivity, an aperture, and the like of the mounted image-capturing device. Moreover, the satellite 21 performs charging in advance so as to obtain sufficient power at the image-capturing date and time.

When the image-capturing date and time designated by the image-capturing instruction comes, the satellite 21 captures an image of the image-capturing target position in step S34.

In step S35, the satellite 21 generates metadata, which is information associated with a satellite image that is an image obtained as a result of image-capturing, and adds the metadata to the satellite image. For example, the satellite 21 can generate, as the metadata, information such as a group ID for identifying the satellite group 23, an individual ID for identifying the satellite 21, an image-capturing target position (a subject position), an image-capturing time, and the like.

In step S36, the satellite 21 transmits (downlinks) the satellite image to which the metadata is added, to the ground station 13. The downlink may be performed immediately after the satellite image and the metadata are generated, or may be performed when the satellite 21 reaches within a predetermined range of the predetermined ground station 13. Furthermore, the satellite image may be transmitted via the relay satellite 22.

In step S16, the ground station 13 receives the satellite image transmitted from the satellite 21. The received satellite image is supplied to the satellite management device 11 via the network 12.

In step S17, the satellite management device 11 analyzes the metadata of the satellite image. At this time, the satellite management device 11 may newly generate metadata on the basis of an analysis result, and add the metadata. For example, the satellite management device 11 calculates a satellite position at the time of image-capturing on the basis of the group ID and the individual ID of the satellite image and the orbit information of the satellite 21, and adds the satellite position as the metadata.

In step S18, the satellite management device 11 performs predetermined image processing on a satellite image. The satellite management device 11 performs, for example, correction processing such as distortion correction, image synthesis processing such as color synthesis processing, and the like.

In step S19, the satellite management device 11 stores the satellite image after the image processing in a predetermined storage unit. Alternatively, the satellite management device 11 may transmit the satellite image after the image processing to a device (a server) owned by the customer.

Thus, a series of sequences of capturing an image of a predetermined area on the ground is completed. Note that the analysis of the metadata and the image processing described as being performed by the satellite management device 11 in the basic sequence described above may be performed by the ground station 13. The analysis of the metadata and the image processing of the satellite image can be appropriately shared and executed between the satellite management device 11 and the ground station 13, in accordance with contents of the processing and the like.

Furthermore, in the above-described example, the metadata is added to the satellite image and transmitted, but the metadata may be transmitted as a stream different from the satellite image.

<3. First Satellite Data Transmission Processing>

Meanwhile, in recent years, performance of a camera mounted on the satellite 21 has been improved, and a high-quality image has been able to be obtained. Along with this, data of the satellite image has also been increased. Whereas, communication of the satellite 21 with the ground station 13 is limited to several minutes to several tens of minutes in which the satellite 21 passes in the sky above the ground station 13, except for inter-satellite communication. Therefore, if data of a satellite image captured by the satellite 21 is transmitted as it is, there is a case where the data cannot be transmitted to the ground by one path due to an excessively large data amount, an insufficient communication band, or the like. Here, one path represents a unit of communication that can be regarded as a series of communication performed between the satellite 21 and the ground station 13. For example, one path corresponds to a series of communication performed in a communicable period from entry to exit of the satellite 21 passing in the sky into and from a communication range of a predetermined ground station 13 on the ground.

In a case where there is a sufficient margin for communication data and bandwidth, the data of the satellite image may simply be transmitted as it is as in the above-described basic sequence. However, in a case where the data cannot be transmitted to the ground by one path, it is required to efficiently transmit data necessary on the ground.

Figure 4:
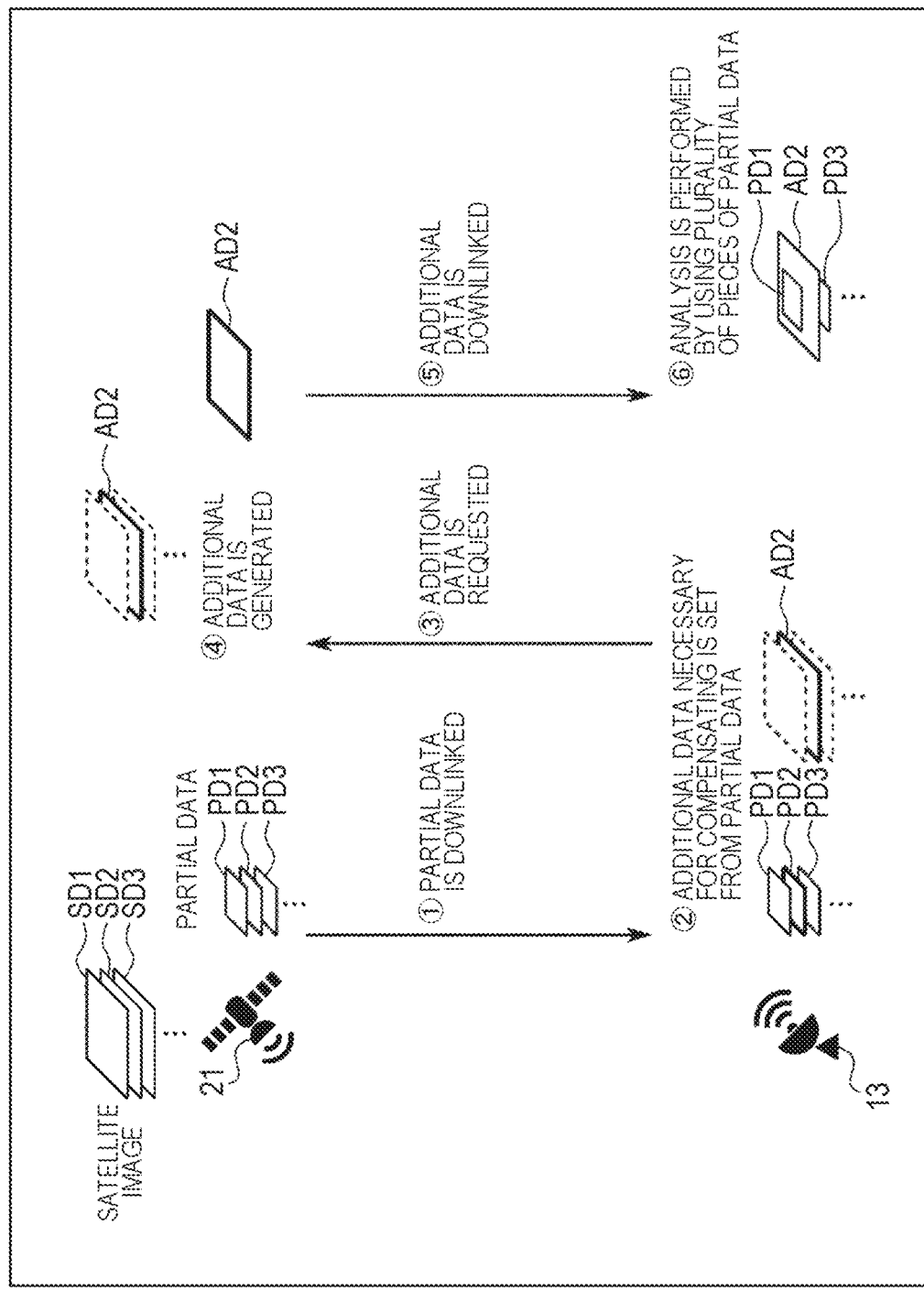
FIG. 4 is a diagram for explaining a flow of data transmission in first satellite data transmission processing.

Therefore, the satellite image processing system 1 of FIG. 1 performs efficient transmission of a satellite image based on a dynamic request from the ground station 13 as illustrated in FIG. 4.

FIG. 4 illustrates a flow of data transmission in first satellite data transmission processing executed by the satellite image processing system 1 of FIG. 1.

In the example of FIG. 4, it is assumed that three satellite images SD1 to SD3 have already been generated by image-capturing in the satellite 21. Each of the three satellite images SD1 to SD3 may be a still image or a moving image.

(1) The satellite 21 generates partial data PD1 to PD3 of the respective three satellite images SD1 to SD3, and downlinks to the ground station 13.

(2) The ground station 13 detects whether there is insufficient data on the basis of the received partial data PD1 to PD3. In a case where there is insufficient data, the ground station 13 sets additional partial data (hereinafter, referred to as additional data) for compensating for the insufficient data. For example, the ground station 13 determines that the data is insufficient for the partial data PD2 among the partial data PD1 to PD3, and sets additional data AD2.

(3) The ground station 13 requests the satellite 21 for the additional data AD2.

(4) The satellite 21 receives the request for additional data from the ground station 13, and generates the additional data AD2 from the satellite image SD2.

(5) The satellite 21 downlinks the generated additional data AD2 to the ground station 13.

(6) The ground station 13 receives the additional data AD2 received from the satellite 21. For the satellite image SD2, the ground station 13 analyzes the satellite image SD2 by using a plurality of pieces of partial data acquired from the satellite 21, that is, the first partial data PD2 and the additional data AD2. In a case where it is determined that the additional data is necessary even after the acquisition of the additional data AD2, the processing of (3) to (5) described above is repeated. The satellite image SD1 is analyzed by using only the partial data PD1 for the satellite image SD1, and the satellite image SD3 is analyzed by using only the partial data PD3 for the satellite image SD3.

Figure 5:
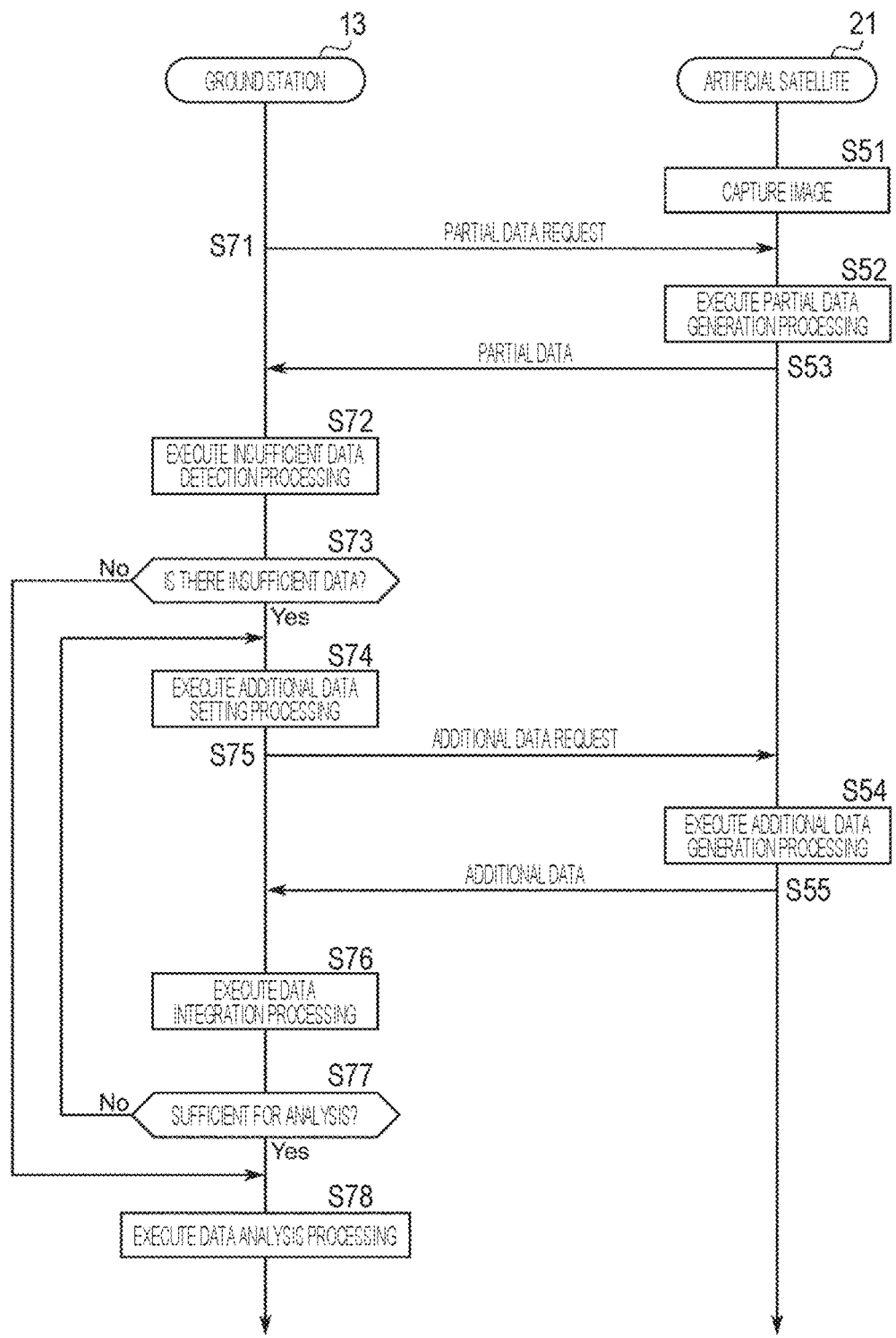
FIG. 5 is a flowchart for explaining the first satellite data transmission processing.

With reference to the flowchart of FIG. 5, the first satellite data transmission processing of performing efficient data transmission will be further described. The processing of FIG. 5 is processing started after the satellite 21 receives an image-capturing instruction from the ground station 13.

First, in step S51, on the basis of the image-capturing instruction from the ground station 13, the satellite 21 captures an image of an image-capturing target position when reaching a predetermined image-capturing point. The processing of step S51 may be performed a plurality of times before the next step S71 is executed. A satellite image obtained here before reduction, thinning, or the like is performed is also referred to as complete data of the satellite image, in comparison with partial data.

In step S71, the ground station 13 transmits, to the satellite 21, a partial data request for requesting partial data of the satellite image obtained by the image-capturing.

In step S52, the satellite 21 receives the partial data request from the ground station 13, and executes partial data generation processing of generating partial data of the satellite image. Then, in step S53, the satellite 21 transmits the generated partial data to the ground station 13, as a response to the partial data request from the ground station 13.

In step S72, the ground station 13 receives the partial data transmitted from the satellite 21, and executes insufficient data detection processing of detecting whether there is insufficiency in the received partial data. This insufficient data detection processing is one of analysis processing of analyzing partial data.

In the insufficient data detection processing, for example, the ground station 13 compares current partial data acquired this time with partial data acquired in the past. In a case where in a case where there is a difference from the past partial data, the ground station 13 determines that additional data is necessary for more precise analysis, that is, there is insufficient data.

More specifically, for example, in a case of executing object recognition of a vehicle or the like appearing in a satellite image as data analysis processing in step S78 to be described later, in a case where there is no difference between the partial data acquired this time and the partial data in the past, the ground station 13 can use fine data in the past, and thus determines that there is no insufficient data. Furthermore, for example, in a case of executing detection of a vegetation status of a farm or the like appearing in a satellite image as the data analysis processing in step S78 to be described later, in a case where there is no difference between partial data acquired this time and partial data in the past, the ground station 13 determines that there is no insufficient data. In a case where there is a difference, the ground station 13 determines that additional data is necessary, that is, there is insufficient data, for acquiring precise data and reconstruct a vegetation map.

Furthermore, the ground station 13 executes recognition processing on the partial data as the insufficient data detection processing, and determines that more precise additional data is necessary, that is, there is insufficient data, on the basis of a result of the recognition processing.

More specifically, for example, the ground station 13 executes object recognition processing of a vehicle or the like appearing in a satellite image as the insufficient data detection processing, and determines that more precise additional data is necessary, that is, there is insufficient data, in a case where reliability of the recognition processing is low with the partial data. Furthermore, for example, the ground station 13 detects a vegetation status of a farm or the like appearing in a satellite image as the insufficient data detection processing, and determines that more precise additional data is necessary, that is, there is insufficient data, in a case where estimation accuracy of the vegetation status is low.

In step S73, the ground station 13 determines whether there is insufficient data as a result of the insufficient data detection processing, and the processing proceeds to step S74 when it is determined that there is insufficient data. Whereas, when it is determined that there is no insufficient data, the processing proceeds to step S78 described later.

When it is determined in step S73 that there is insufficient data, the ground station 13 executes additional data setting processing of setting additional data related to the partial data in step S74, and transmits, to the satellite 21, an additional data request for requesting downlink of additional data in step S75. Specific examples of the partial data generation processing and the additional data setting processing will be described later with reference to FIGS. 6A, 6B, 6C, 7, 8, 9A, and 9B and the like.

In step S54, the satellite 21 receives the additional data request from the ground station 13, and executes additional data generation processing of generating additional data. Then, in step S55, the satellite 21 transmits the generated additional data to the ground station 13 as a response to the additional data request.

In step S76, the ground station 13 receives the additional data transmitted from the satellite 21, and executes data integration processing of integrating the partial data acquired first and the additional data acquired thereafter.

In step S77, the ground station 13 determines whether integrated data obtained by integrating the partial data acquired first and the additional data acquired thereafter is sufficient for performing data analysis. The processing of step S77 is similar to the insufficient data detection processing of determining whether or not there is insufficient data.

When it is determined in step S77 that it is not yet sufficient to perform data analysis, the processing returns to step S74, and the processing of steps S74 to S77 described above is repeated. That is, the ground station 13 further requests and acquires additional data related to the partial data.

Whereas, when it is determined in step S77 that it is sufficient for performing data analysis, the processing proceeds to step S78, and the ground station 13 executes the data analysis processing using the integrated data or the partial data acquired from the satellite 21. A result of the data analysis processing is stored in the storage unit and transmitted to the customer.

As described above, in the first satellite data transmission processing of the satellite image processing system 1, first, partial data of a satellite image obtained by image-capturing is transmitted to the ground station 13. In a case where it is determined that there is insufficiency in the partial data, additional data related to the partial data is dynamically requested to the satellite 21 and acquired. As a result, since only data necessary for data analysis is transmitted between the satellite 21 and the ground station 13, a communication time and a data amount can be suppressed, and data can be efficiently transmitted. The ground station 13 can efficiently acquire data.

The series of processing described in FIG. 5 may be performed in one path or may be divided and performed in a plurality of paths. In a case where the processing is divided and performed in a plurality of paths, for example, when communication between the satellite 21 and the ground station 13 is roughly classified into (A) communication for acquiring partial data (steps S71 and S53), (B) request for additional data from the ground station 13 to the satellite 21 (step S75), and (C) downlink of additional data from the satellite 21 to the ground station 13 (step S55), (A), (B), and (C) may be individually executed in different paths, or (A) may be executed in the first path and (B) and (C) may be performed in the next path. Alternatively, (A) and (B) may be executed in the first path, and (C) may be executed in the next path. The first path and the next path may be, for example, several hours or several days later. In a case where inter-satellite communication is used in which the satellite 21 that relays communication is interposed, a long communication period of a certain extent can be secured, and thus, it is easy to perform communication in one path.

With reference to FIGS. 6A, 6B, 6C, 7, 8, 9A, and 9B, the partial data generation processing of generating partial data of a satellite image will be described.

Figure 6A:
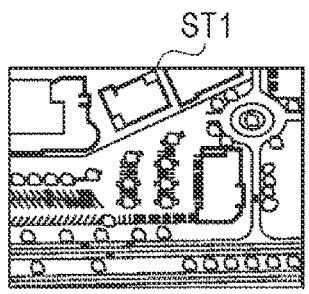
FIGS. 6A, 6B, and 6C are diagrams for explaining partial data generation processing.

A satellite image ST1 illustrated in FIG. 6A is an image obtained by image-capturing by the satellite 21.

Figure 6B:
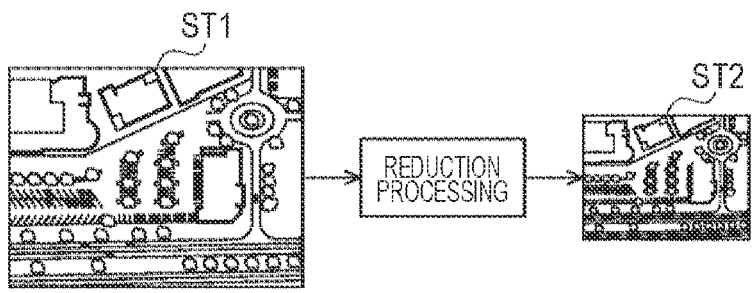

For example, as the partial data generation processing, the satellite 21 generates partial data ST2 by executing reduction processing on the satellite image ST1 as illustrated in FIG. 6B. The reduction processing is, for example, on the satellite image ST1, low resolution processing of reducing a resolution, low frame rate processing of reducing a frame rate, low bit length processing of reducing a bit length, or the like, and reduces a data amount of the satellite image ST1.

With respect to such partial data, additional data that is set in the additional data setting processing is, for example, data (an image) having a higher resolution, frame rate, or bit length than the partial data ST2. Furthermore, instead of data in which the resolution, the frame rate, or the bit length is increased with respect to the entire partial data, data may be used in which a partial area of the partial data is designated, and the resolution, the frame rate, or the bit length of only the area is increased.

Figure 6C:
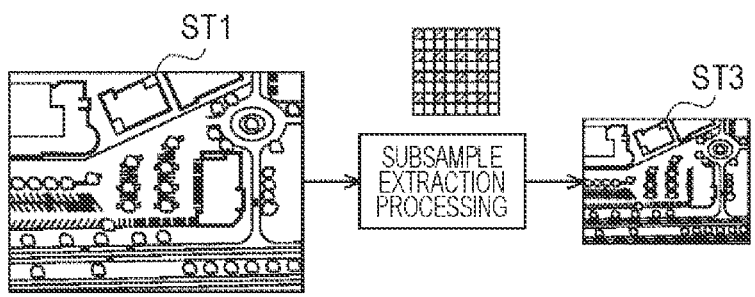

Furthermore, for example, as the partial data generation processing, the satellite 21 generates partial data ST3 by executing subsample extraction processing on the satellite image ST1 as illustrated in FIG. 6C.

FIG. 7 illustrates an example of partial data generated by the subsample extraction processing.

The subsample extraction processing is processing of generating an image (a subsampled image) with pixels obtained by thinning a high-resolution image in accordance with a predetermined rule, and different pixels are sampled between subsampled images having different resolutions.

In the example of FIG. 7, the subsample extraction processing is performed on the satellite image ST1 of FIGS.

6A, 6B, and 6C, to generate subsampled images ST21, ST22, ST23, and ST24 as partial data. The resolution is increased in the order of the subsampled images ST21, ST22, ST23, and ST24 (ST21<ST22<ST23<ST24).

For example, with respect to the satellite image ST1, the satellite 21 transmits the subsampled image ST21 as partial data to be first transmitted to the ground station 13. Then, when receiving an additional data request, the satellite 21 transmits, as additional data to the ground station 13, subsampled images whose resolution is gradually increased, such as the subsampled images ST22, ST23, and ST24.

Pixels (subsample phases) extracted as subsampled images are indicated by hatching (oblique lines) in 8×8 blocks illustrated on an upper side of each of the subsampled images ST21 to ST24. Dotted pixels indicate pixels transmitted in the preceding subsampled image.

By configuring subsampled images such that extracted pixels are different between subsampled images having different resolutions in this manner, data acquired in the past is not to be redundant when data integration processing of integrating the plurality of subsampled images (partial data) divided and acquired in a plurality of times is executed. Therefore, data can be acquired with higher efficiency, and the data analysis processing using an integrated image can be executed with high accuracy. Note that the recognition processing using a plurality of subsampled images will be described later with reference to FIGS. 21 to 31.

FIG. 8 illustrates examples of low-resolution images ST21, ST22, ST23, and ST24 as comparative examples.

The low-resolution images ST31, ST32, ST33, and ST34 are images generated by simply thinning a resolution of the satellite image ST1 such as ⅛, ¼, and ½. The resolution is increased in the order of the low-resolution images ST31, ST32, ST33, and ST34 (ST31<ST32<ST33<ST34).

For example, with respect to the satellite image ST1, the satellite 21 transmits the low-resolution image ST31 as partial data to be first transmitted to the ground station 13. Then, when receiving an additional data request, the satellite 21 transmits, as additional data to the ground station 13, subsampled images whose resolution is gradually increased, such as the low-resolution images ST32, ST33, and ST34.

In the pixels illustrated on an upper side of each of the low-resolution images ST31 to ST34, dotted pixels indicate pixels transmitted in the previous subsampled image.

In transmission of such a low-resolution image, the low-resolution image to be transmitted next as partial data includes pixels of a low-resolution image previously transmitted, and thus data overlaps and data transmitted in the past is wasted. As illustrated in FIG. 7, data can be transmitted with high efficiency by generating partial data by the subsample extraction processing.

A relationship between partial data and additional data with respect to the number of captured images may be, for example, any of the following.

For example, in a case where data of one satellite image has a large amount, the relationship may be adopted in which the partial data is the subsampled image ST21 of FIG. 7, and the additional data is the subsampled image ST22 of FIG. 7. This is particularly effective in a case where communicable time with the ground station 13 is short.

Whereas, in a case where the data amount of one satellite image is not large but the amount is large when all the 10,000 satellite images are to be downlinked, it is possible to set and downlink index data for each of the 10,000 satellite images as partial data. The index data may be a thumbnail image or an image of a part of a specific area of the satellite image. In this case, the additional data can be, for example, data that complements each of 10,000 images such as subsampled images. Alternatively, the additional data may be a predetermined number of pieces (for example, five pieces) of complete data out of 10,000 pieces.

FIGS. 9A and 9B illustrate another example of the partial data generation processing.

For example, as illustrated in FIG. 9A, as the partial data generation processing, the satellite 21 generates partial data PT1 by executing feature amount conversion processing of converting the satellite image ST1 into a predetermined feature amount. Although the calculation cost of the feature amount conversion is generated on the satellite 21 side, an information amount can be reduced by the conversion into the feature amount. For example, data obtained by performing FFT conversion on the satellite image ST1 to convert into a frequency domain may be used as the partial data PT1. The data converted into the frequency domain has an advantage that there are less artifacts in a decoded image.

Furthermore, the satellite 21 may execute object recognition processing as the feature amount conversion processing on the satellite image ST1, and may use a recognition result of the object as the partial data PT1. By using the recognition result of the object as the feature amount, the information amount can be greatly reduced.

Moreover, as illustrated in FIG. 9B, as the partial data generation processing, both the feature amount conversion processing and the subsample extraction processing described above may be executed. For example, the satellite 21 executes the feature amount conversion processing on the satellite image ST1, and further executes the subsample extraction processing on the partial data PT1 obtained as a result. Then, partial data PT2 obtained as a result of the subsample extraction processing is transmitted to the ground station 13. The order of the feature amount conversion processing and the subsample extraction processing may be reversed.

<4. Functional Block Diagram of Ground Station and Satellite>

Figure 10:
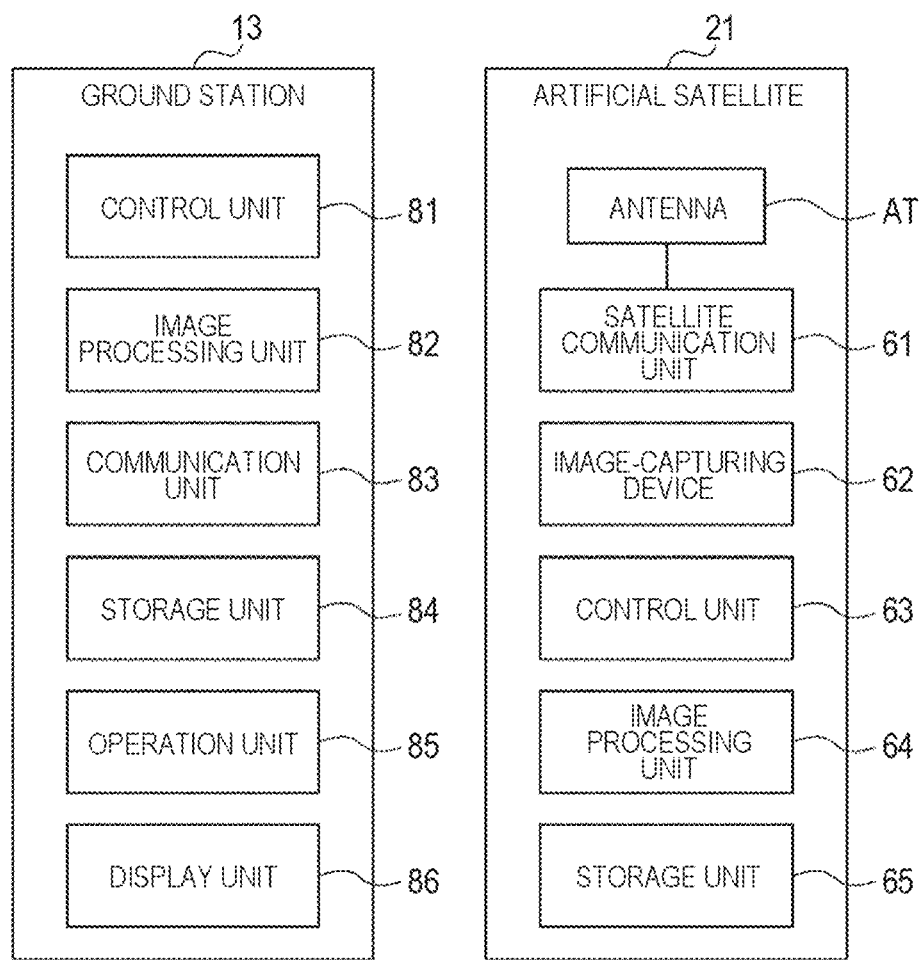
FIG. 10 is a functional block diagram of a ground station and a satellite.

FIG. 10 illustrates a functional block diagram of the ground station 13 and the satellite 21 that perform efficient transmission of data by using the partial data described above.

The ground station 13 includes a control unit 81, an image processing unit 82, a communication unit 83, a storage unit 84, an operation unit 85, and a display unit 86.

The control unit 81 controls the entire operation of the ground station 13 by executing a program stored in the storage unit 84. For example, the control unit 81 controls transmission of an image-capturing instruction to a predetermined satellite 21 designated by the satellite management device 11, and reception of a satellite image and partial data thereof transmitted from the satellite 21.

The image processing unit 82 performs image processing on a satellite image transmitted from the satellite 21. Specifically, the image processing unit 82 performs: the insufficient data detection processing of detecting whether or not there is insufficiency in partial data transmitted from the satellite 21; the additional data setting processing of setting additional data in a case where it is determined that there is insufficient data; the data integration processing of integrating partial data acquired before and additional data acquired thereafter; and the data analysis processing of performing data analysis using integrated data; and the like. In addition, the image processing unit 82 also performs predetermined image processing on a satellite image, such as, for example, metadata generation processing of adding predetermined metadata to the captured image, correction processing such as distortion correction of the captured image, image synthesis processing such as color synthesis processing, and the like.

In accordance with an instruction from the control unit 81, the communication unit 83 performs predetermined communication with the satellite management device 11 via the network 12, and also performs communication with the satellite 21. For example, the communication unit 83 receives partial data or complete data of a satellite image transmitted from the satellite 21.

The storage unit 84 stores data such as partial data of a satellite image, a result of the data analysis processing, an operation control program, and the like in accordance with an instruction from the control unit 81.

The operation unit 85 includes, for example, a keyboard, a mouse, a touch panel, or the like, receives a command or data input based on a user (operator) operation, and supplies to the control unit 81.

The display unit 86 includes, for example, a liquid crystal display (LCD) or an organic electro luminescence (EL) display. The display unit 86 displays a satellite image received from the satellite 21, a result of the data analysis processing, a result of communication with the satellite 21, and the like.

The satellite 21 includes an antenna AT, a satellite communication unit 61, an image-capturing device 62, a control unit 63, an image processing unit 64, and a storage unit 65. Note that this configuration of the satellite 21 is mainly only for functions related to an image. Although not illustrated, the satellite 21 also includes propulsion devices such as a solid motor and an ion engine regarding attitude control, sensors such as a GPS receiver, a star tracker (an attitude sensor), an acceleration sensor, and a gyro sensor regarding position control, power supplies such as a battery and a solar panel, and the like.

On the basis of the control of the control unit 63, the satellite communication unit 61 receives an image-capturing instruction and a data request indicating a request for partial data transmitted from the satellite 21, and transmits image data of an image captured by the image-capturing device 62, state data indicating a state of the satellite 21 at the time of image-capturing, and the like, to the ground station 13 via the antenna AT.

In a case where the satellite 21 is an optical satellite, the image-capturing device 62 includes, for example, a camera module including an image sensor (an optical sensor), and captures an image of a target object on the basis of the control of the control unit 63. In a case where the satellite 21 is a synthetic aperture radar (SAR) satellite, the image-capturing device 62 includes a radar device. A sensitivity and a shutter speed, a resolution, monochrome and color, a band (a wavelength range), and the like of the image sensor mounted on the image-capturing device 62 vary depending on application, a size, and the like of the satellite 21. The image-capturing device 62 may include a plurality of image sensors such as, for example, a multi spectrum camera of red (R) and infrared (IR), and monochrome and color (RGB).

The control unit 63 controls the entire operation of the satellite 21. For example, the control unit 63 causes the image-capturing device 62 to perform image-capturing on the basis of an image-capturing instruction from the ground station 13. The control unit 63 causes the satellite communication unit 61 to transmit a satellite image obtained by image-capturing and partial data thereof, and instructs the image processing unit 64 to generate partial data on the basis of an additional data request from the ground station 13.

The image processing unit 64 performs processing of generating partial data from a satellite image obtained by image-capturing by the image-capturing device 62, on the basis of the control of the control unit 63. Furthermore, the image processing unit 64 performs predetermined image processing on a satellite image, for example, metadata generation processing of adding predetermined metadata to the satellite image, correction processing such as distortion correction of the satellite image, image synthesis processing such as color synthesis processing, and the like.

The storage unit 65 stores control programs to be executed by the control unit 63 and parameters. Furthermore, as necessary, the storage unit 65 stores complete data, partial data, and the like of a satellite image obtained by image-capturing, and supplies the data to the satellite communication unit 61 or the control unit 63.

The ground station 13 and the satellite 21 having the above configuration can perform the first satellite data transmission processing described above.

Note that the first satellite data transmission processing described above has been described by way of an example of a case where the ground station 13 directly communicates with the satellite 21 that has generated a satellite image. However, the first satellite data transmission processing can also be applied to a case where inter-satellite communication for transmitting data via another satellite 21 is performed. In such a case where the first satellite 21 captures an image in real time and transfers to the second satellite 21 by using inter-satellite communication, and the second satellite 21 downlinks to the ground station 13, real-time data transfer is required, and thus band constraint increases. However, by transmitting the partial data described above and transmitting the additional data as necessary, data can be efficiently transmitted to the ground station 13.

In the first satellite data transmission processing described above, an example has been described in which partial data and additional data of one type of satellite image (complete data) are transmitted. In a case where the satellite 21 includes image sensors of different types such as monochrome/color and R/IR, processing of requesting partial data and additional data can be performed for a satellite image of each of the plurality of image sensors.

<Application Example of First Satellite Data Transmission Processing>

A specific application example of the first satellite data transmission processing will be described.

Agriculture

As partial data, a low-resolution NDVI image indicating a vegetation status is downlinked. As the additional data setting processing, the ground station 13 detects a peculiar area exceeding a specific threshold value in the low-resolution NDVI image, and requests a high-resolution NDVI image of only the area as the additional data. Alternatively, as the additional data setting processing, the ground station 13 sets and requests data of another wavelength band (band) as the additional data. As a result, highly accurate analysis becomes possible.

Ocean (Ship Monitoring)

Since data becomes enormous for the entire ocean, data at a level at which a change point is barely known is downlinked as partial data for an image including a certain area of the ocean as a subject. For example, data of a degree that a position of a ship can be barely known or data of a feature amount that enables only the position of the ship to be known is set as the partial data. The ground station 13 collates with automatic identification system (AIS) information indicating the position of the ship, and sets and requests a high-resolution image as the additional data only for a place where the ship does not exist in the AIS information, by using a collation result (a recognition result). As a result, it is possible to further analyze only a suspicious area. Not only a mobile object on the ocean such as a ship, but also a structure on the ocean such as a buoy can be similarly analyzed.

Urban Development

For example, a low-resolution satellite image obtained by image-capturing of an urban area is downlinked as partial data. As the additional data setting processing, the ground station 13 collates a downlinked low-resolution satellite image with a satellite image in the past, extracts a change point, and sets and requests, as the additional data, a high-resolution satellite image only in an area extracted as the change point. As a result, highly accurate analysis of the area where the change point has occurred becomes possible.

<5. Second Satellite Data Transmission Processing>

Next, second satellite data transmission processing will be described.

In the first satellite data transmission processing described above, the satellite 21 generates partial data in response to a dynamic request from the ground station 13 on the basis of a satellite image obtained by image-capturing of the ground, and downlinks the partial data to the ground station 13. The downlink can be normally performed only for a predetermined period in which the satellite 21 passes in the sky above the ground station 13.

While the performance of the camera mounted on the satellite 21 is improved and data of a satellite image is also increasing, it is necessary for the satellite 21 to hold the satellite image until the satellite 21 reaches in the sky above the ground station 13 to be able to downlink, and resources (storage) of the satellite 21 are suppressed.

Therefore, data transmission of satellite images by efficiently using the resources of the satellite 21 will be described below.

Figure 11:
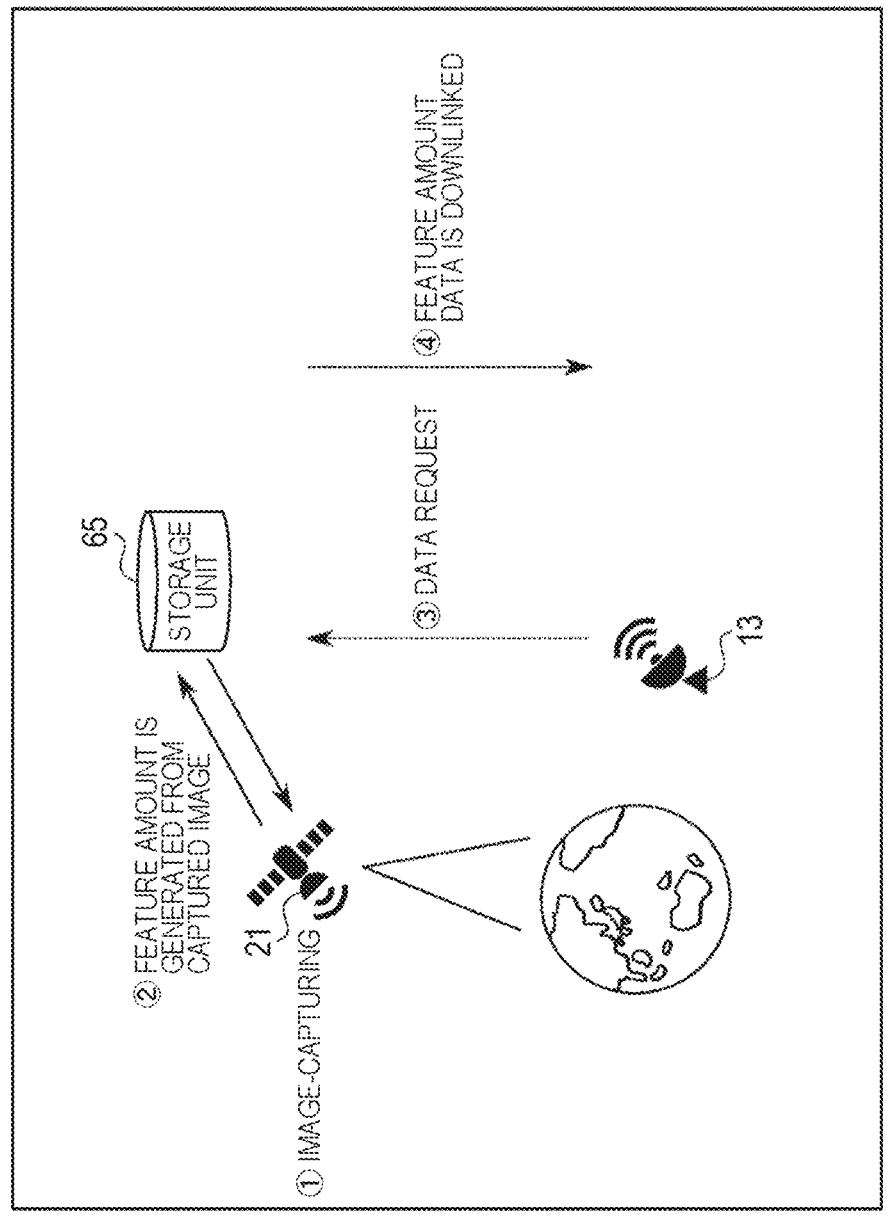
FIG. 11 is a diagram for explaining a flow of data transmission in second satellite data transmission processing.

FIG. 11 illustrates a flow of data transmission in second satellite data transmission processing executed by the satellite image processing system 1 of FIG. 1.

(1) The satellite 21 captures an image of an image-capturing target area on the ground. There are cases of image-capturing for a visualization purpose and a recognition purpose.

(2) The satellite 21 executes feature amount generation processing of generating a feature amount of a satellite image from the satellite image obtained by image-capturing, and stores feature amount data obtained as a result in the storage unit 65. In a case where the image-capturing is for the visualization purpose, the satellite 21 generates and stores a feature amount that facilitates image restoration processing and the like. In a case where image-capturing is for the recognition purpose, the satellite 21 generates and stores a feature amount that does not lower recognition accuracy. The generated feature amount does not need to be an image.

(3) When the satellite 21 passes in the sky above the ground station 13, the ground station 13 requests the satellite 21 for feature amount data.

(4) The satellite 21 receives the request for feature amount data from the ground station 13, and downlinks the feature amount data (feature amount information) stored in the storage unit 65, to the ground station 13.

In the first satellite data transmission processing described above, the ground station 13 analyzes a satellite image by using downlinked partial data (including additional data). However, in the second satellite data transmission processing, the satellite 21 stores and downlinks feature amount data converted in advance into feature amount data necessary for analysis on the premise of the analysis processing of the satellite image in the ground station 13. As a result, the resources (storage) of the satellite 21 can be efficiently used, and data transmission between the satellite 21 and the ground station 13 can be efficiently performed.

The satellite 21 stores only the feature amount data in the storage unit 65, and does not store (erases) original data, that is, the satellite image itself obtained by image-capturing.

The ground station 13 acquires, from the satellite 21, the feature amount data of the satellite image obtained by image-capturing of the image-capturing target area on the ground, and generates complete data (complete information), which is complemented data, by using the acquired feature amount data and complementing data (complementing information). The complementing data is data already held by the ground station 13 at the time of acquisition of the feature amount data, and is, for example, information in the past (before the time of capturing the satellite image from which the acquired feature amount data is created) regarding the image-capturing target area of the satellite image captured by the satellite 21.

Figure 12:
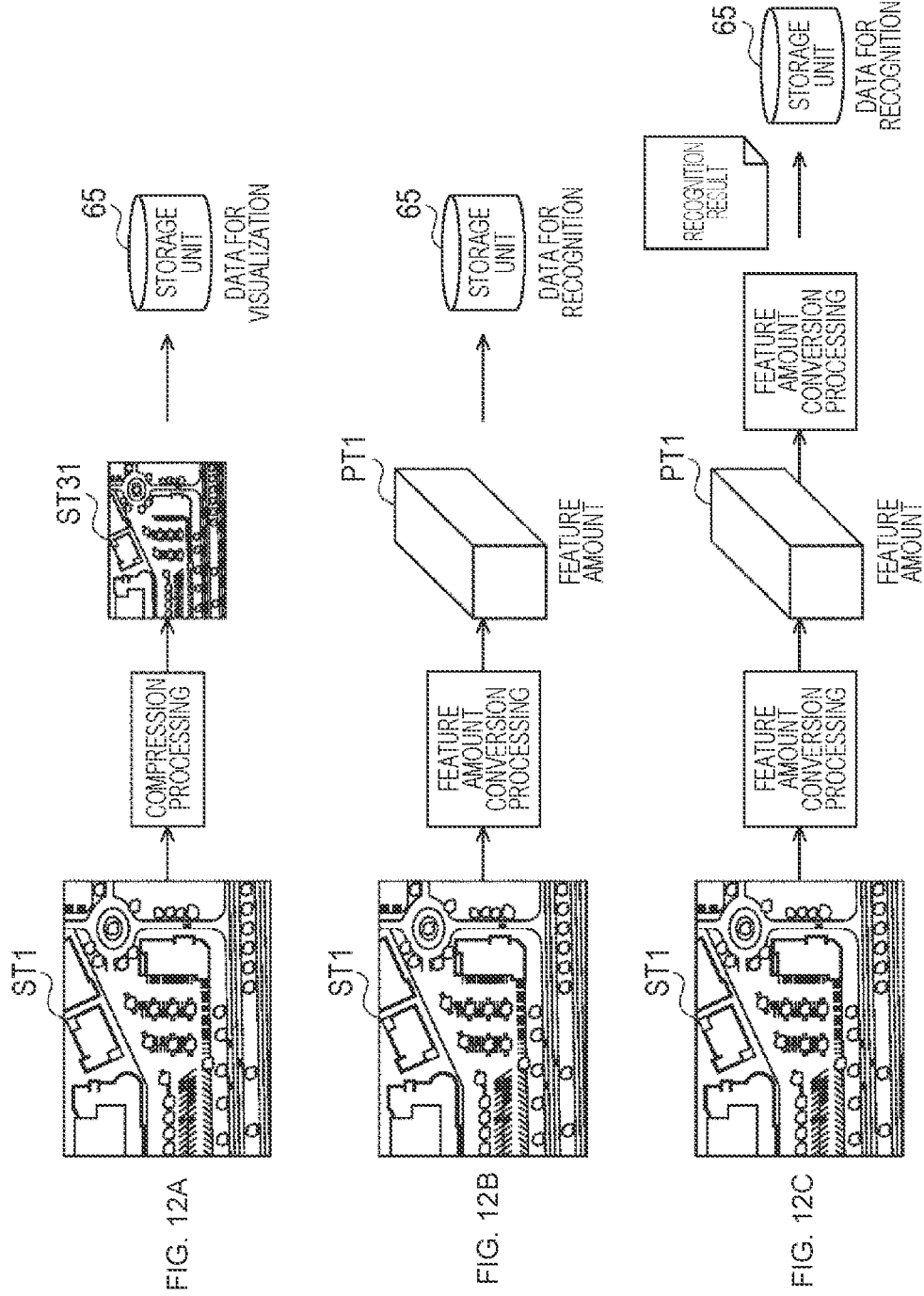
FIGS. 12A, 12B, and 12C are diagrams for explaining generation of feature amount data in the second satellite data transmission processing.

With reference to FIGS. 12A, 12B, and 12C, generation of a feature amount in the second satellite data transmission processing will be described.

FIG. 12A is an example of feature amount data in a case where image-capturing is for the visualization purpose, and illustrates an example in which an image ST31 obtained by executing predetermined compression processing on a satellite image ST1 that is an optical satellite image is generated as feature amount data of the satellite image. For the predetermined compression processing, for example, an image compression technology such as JPEG or MPEG used for a moving image or a still image can be adopted.

FIGS. 12B and 12C are examples of feature amount data in a case where image-capturing is for the recognition purpose.

As illustrated in FIG. 12B, the satellite 21 can execute the feature amount conversion processing of converting the satellite image ST1 into a predetermined feature amount, and store and downlink feature amount data obtained as a result.

As an example of the feature amount conversion processing, for example, convolutional neural network (CNN), which is a type of deep learning processing on an image, can be adopted. For example, an arithmetic value of a convolution layer or a pooling layer of the CNN can be stored as the feature amount. A value obtained by further reducing a bit length or a resolution of the arithmetic value of the convolution layer or the pooling layer of the CNN may also be used as the feature amount. Furthermore, for example, as the feature amount conversion processing, prediction processing of machine learning may be adopted in which a predetermined feature amount obtained by reducing a data amount is predicted and output by using a satellite image as an input.

In a case where data after the feature amount conversion processing is stored as the feature amount data and transmitted to the ground station 13, it is possible to compress (reduce) the information amount, and it is possible to store, by the feature amount conversion for recognition, information that is to be dropped in the feature amount conversion for visualization. The ground station 13 can perform highly accurate or various types of recognition processing on the basis of the feature amount. However, in a case where a required feature amount differs depending on a recognition task performed by the ground station 13, and a feature amount transmitted from the satellite 21 is different from a feature amount required by the ground station 13, the recognition accuracy may decrease. Furthermore, in a case where the feature amount required by the ground station 13 is unknown, it may be necessary to generate and store a plurality of feature amounts and transmit to the ground station 13.

The feature amount conversion processing may be processing of extracting a feature amount of a satellite image. In a case where the ground station 13 executes recognition processing of recognizing a vehicle appearing in a satellite image as a subject of the recognition target, it is possible to store, as the feature amount data, a feature amount for identifying a recognition processing target region of the satellite image, for example, a feature amount for alignment with a past satellite image or alignment for stitch processing with a satellite image of an adjacent region. For example, vector information or the like of a specific subject such as characteristic topography, a road, a building, or the like is extracted as the feature amount for image alignment. For example, the satellite 21 can extract a difference between a plurality of satellite images acquired with a time difference, and store a change amount of a specific subject, a change amount of the earth's surface, and the like as the feature amount data. Furthermore, for example, information regarding movement of the satellite 21 in a predetermined movement direction can be extracted as a feature amount and stored as the feature amount data. A position of the satellite 21 can be detected by TLE information, positioning based on a GPS signal, direct observation from the ground with use of a laser or an optical means, or the like. In consideration of movement of the satellite 21 itself detected by these methods (after cancellation), the change amount of the specific subject in the satellite image, the change amount of the earth's surface, and the like can be stored as the feature amount data. Information obtained by further adding the feature amount based on movement of the satellite 21 itself and other feature amounts may be stored as the feature amount data. By extracting these pieces of information in advance as feature amounts, data of the satellite image can be efficiently stored and transmitted to the ground station 13.

Furthermore, in a case where the satellite 21 is a camera that performs image-capturing in different bands such as R and IR, feature amount data extracted from a satellite image for each band and feature amount data extracted from an image obtained by integrating a plurality of satellite images of the individual bands can be stored and transmitted to the ground station 13.

As illustrated in FIG. 12C, the satellite 21 can execute the feature amount conversion processing of converting the satellite image ST1 into a predetermined feature amount, execute the recognition processing on the feature amount obtained as a result, and store and downlink metadata of the recognition result as the feature amount data. For example, a recognition result such as "how many cars" is stored and downlinked as the feature amount data from the satellite image of the ground.

In a case where the metadata of the recognition result is stored as the feature amount data and transmitted to the ground station 13, it is possible to greatly compress (reduce) the information amount, and it is possible to store information that is to be dropped in the feature amount conversion for visualization. However, since the recognition processing is processing registered in advance, the ground station 13 side cannot perform highly accurate or various types of recognition processing.

Furthermore, the satellite 21 can execute, as the feature amount generation processing, processing of generating partial data necessary for analysis, which is executed by the ground station 13 in the first satellite data transmission processing described above, and store the generated partial data (including additional data as necessary) as the feature amount data and transmit to the ground station 13.

Figure 13:
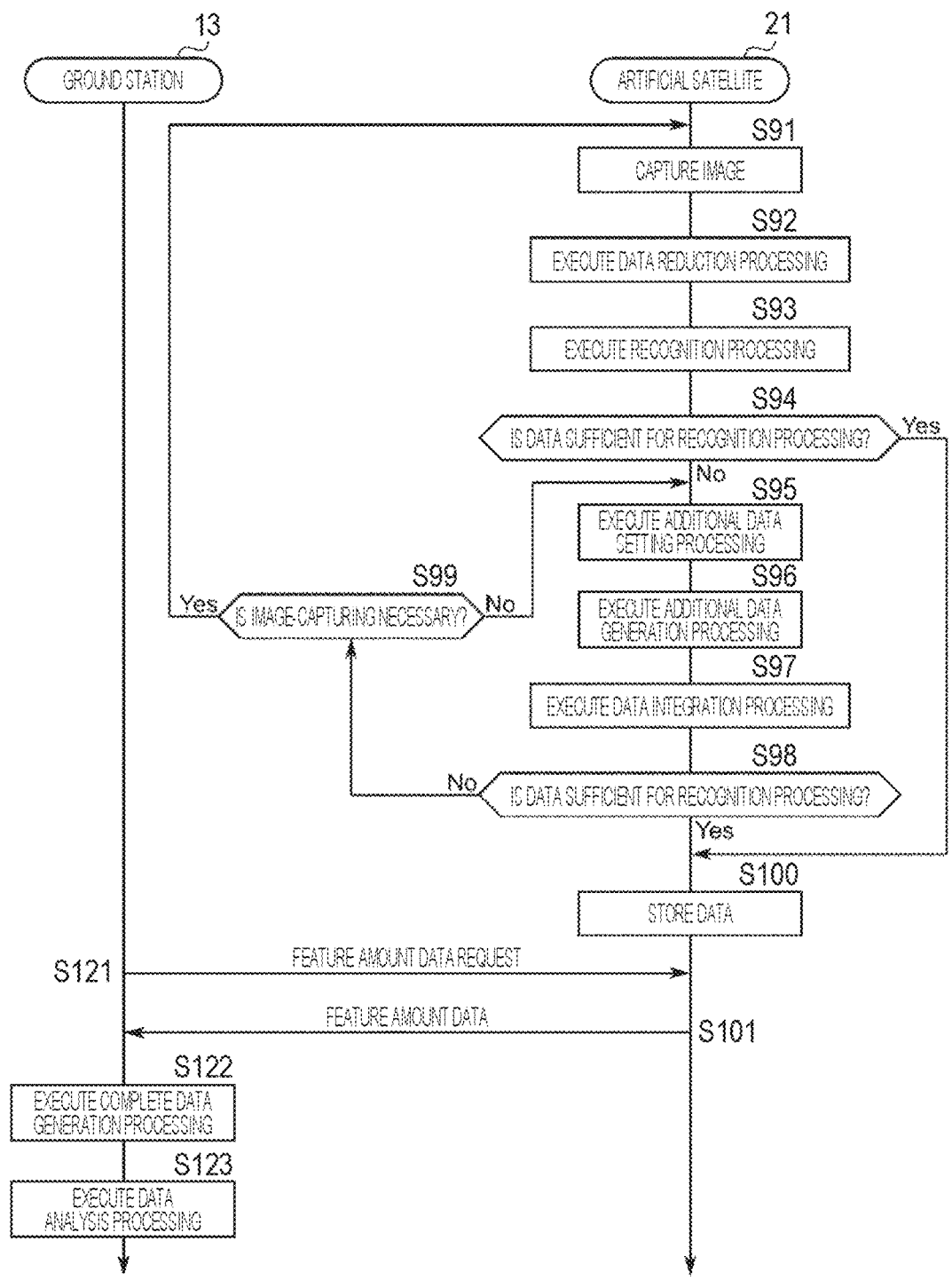
FIG. 13 is a flowchart for explaining the second satellite data transmission processing.

With reference to the flowchart of FIG. 13, the second satellite data transmission processing will be described in which the satellite 21 side executes processing of generating partial data as the feature amount generation processing. The processing of FIG. 13 is started after the satellite 21 receives an image-capturing instruction from the ground station 13.

First, in step S91, on the basis of the image-capturing instruction from the ground station 13, the satellite 21 captures an image of an image-capturing target position when reaching a predetermined image-capturing point. The processing of step S91 may be performed a plurality of times before the next step S92 is executed. By the image-capturing, complete data of the satellite image is obtained.

In step S92, the satellite 21 executes data reduction processing of reducing a data amount by converting the complete data of the satellite image into predetermined feature amount data. As this data reduction processing, for example, the feature amount generation processing described with reference to FIGS. 12A, 12B, and 12C can be executed. Furthermore, as the data reduction processing, it is possible to execute processing similar to the partial data generation processing of generating partial data, which is executed in step S52 of the first satellite data transmission processing described with reference to FIG. 5.

In step S93, the satellite 21 executes recognition processing by using the feature amount data generated by the data reduction processing. This recognition processing is processing of executing recognition processing assumed in the ground station 13 in advance, and checking in advance whether or not recognition can be performed with feature amount data with a reduced data amount. In other words, this processing is processing of executing recognition processing assumed in the ground station 13 in advance and detecting whether or not there is no insufficiency in feature amount data scheduled to be downlinked, which is similar to the insufficient data detection processing executed in step S72 of the first satellite data transmission processing described in FIG. 5.

In step S94, as a result of the recognition processing, the satellite 21 determines whether the generated feature amount data is data sufficient for the recognition processing. When it is determined in step S94 that the feature amount data is sufficient data for the recognition processing, the processing proceeds to step S100 described later.

Whereas, when it is determined in step S94 that the feature amount data is not data sufficient for the recognition processing, the processing proceeds to step S95, and the satellite 21 executes the additional data setting processing of setting additional feature amount data, and executes the additional data generation processing of generating additional feature amount data in step S96. Subsequently, in step S97, the satellite 21 executes data integration processing of integrating the feature amount data generated first and the additional feature amount data generated thereafter.

Then, in step S98, the satellite 21 determines whether the integrated feature amount data is data sufficient for the recognition processing. The processing of step S98 is similar to the determination processing of step S94 described above.

The determination in step S98 may be made after recognition processing similar to that in step S93 is performed as necessary.

When it is determined in step S98 that the integrated feature amount data is not data sufficient for the recognition processing, the processing proceeds to step S99, and the satellite 21 determines whether image-capturing again is necessary. For example, in a case where a sufficient recognition result cannot be obtained in the generated feature amount data due to insufficient resolution of the satellite image, there is a limit to improvement of the recognition result no matter how much the feature amount data is generated on the basis of the current satellite image. In such a case, it is necessary to change the resolution (increase the resolution) and perform image-capturing again. Alternatively, in a case where it is determined by the recognition processing that details of a specific area of the current satellite image are necessary, it is necessary to perform image-capturing again by zooming to the specific area.

When it is determined in step S99 that image-capturing again is necessary, the processing returns to step S91, and the processing in and after step S91 described above is executed again. That is, image-capturing of the image-capturing target position, generation of predetermined feature amount data from the satellite image obtained by the image-capturing, and the like are executed.

Whereas, when it is determined in step S99 that image-capturing again is not necessary, the processing returns to step S95, and the processing in and after step S95 described above is executed again. That is, generation of additional feature amount data, data integration processing of the generated feature amount data and feature amount data previously generated, and the like are executed.

Whereas, when it is determined in step S98 described above that the integrated feature amount data is sufficient data for the recognition processing, the processing proceeds to step S100, and the satellite 21 performs data storage of the generated feature amount data. As a result, the generated feature amount data or the feature amount data after the integration processing in a case where the data integration processing is performed is stored in the storage unit 65, and the original satellite image (complete data) is not stored in the storage unit 65.

In step S121, the ground station 13 transmits, to the satellite 21, a feature amount data request for requesting feature amount data at a timing at which the satellite 21 passes in the sky above the ground station 13.

In step S101, the satellite 21 receives the feature amount data request from the ground station 13, and transmits the feature amount data stored in the storage unit 65, to the ground station 13 as a response.

In step S122, the ground station 13 receives the feature amount data transmitted from the satellite 21, executes complete data generation processing on the basis of the received feature amount data and complementing data, and generates complete data for analysis processing. The complementing data is held in the ground station 13 in advance.

In step S123, the ground station 13 executes the data analysis processing of performing analysis based on the generated complete data for analysis processing. A result of the data analysis processing is stored in the storage unit 84 and transmitted to the customer.

For example, the ground station 13 receives, as the feature amount data, the number of vehicles or the like as a result of recognition processing of a certain analysis target region, from the satellite 21. The ground station 13 acquires, for example, the number of vehicles in the past in the same analysis target region as the complementing data, and generates complete data for analysis processing. Alternatively, the ground station 13 acquires, for example, information regarding commercial facilities in the same analysis target region, information regarding roads and buildings, and the like as complementing data, and generates complete data for analysis processing. As the data analysis processing, the ground station 13 analyzes a variation in traffic volume in the analysis target region on the day on which the satellite 21 captures the image.

As described above, in the second satellite data transmission processing by the satellite image processing system 1, the satellite 21 executes the recognition processing corresponding to the insufficient data detection processing executed by the ground station 13 in the first satellite data transmission processing described above, assumingly creates and stores in advance feature amount data necessary for the recognition processing, and transmits the feature amount data to the ground station 13. The satellite image, which is the original data of the feature amount data, is not stored.

As a result, the information amount can be compressed (reduced), and the resources of the satellite 21 can be efficiently used. Since the generated feature amount data is data necessary for the recognition processing, it is possible to store information that is to be dropped in the feature amount conversion for visualization. The ground station 13 can perform highly accurate or various types of recognition processing on the basis of the feature amount. However, a required feature amount differs depending on a recognition task performed by the ground station 13, and the recognition accuracy may decrease in a case where a feature amount transmitted from the satellite 21 is different from a feature amount required by the ground station 13. Furthermore, in a case where the feature amount required by the ground station 13 is unknown, it may be necessary to generate and store a plurality of feature amounts and transmit to the ground station 13.

The recognition processing that is executed by the satellite 21 and recognizes insufficient data may be lightweight and general-purpose processing that indirectly recognizes feature amount data necessary for data analysis, or may be processing of directly extracting the feature amount data necessary for recognition by using a recognizer or the like generated by machine learning. For example, in a case where the lightweight and general-purpose recognition processing is processing of recognizing whether or not a resolution is insufficient on the basis of a score of the recognition processing and determining that a high-resolution satellite image is necessary, in the direct recognition processing, the recognition processing can be performed by a recognizer that explicitly outputs necessary resolution, for example, an image size (the number of pixels), a frame rate, a bit length, and the like.

In the second satellite data transmission processing, in a case where the feature amount data necessary for the recognition processing cannot be obtained from the satellite image acquired first, image-capturing can be performed again, and the feature amount data can be prepared on the basis of the satellite image captured under a new image-capturing condition. As a result, data necessary for recognition processing can be efficiently acquired and transmitted.

Each of the ground station 13 and the satellite 21 that execute the second satellite data transmission processing can be implemented by the configuration illustrated in FIG. 10, and the processing performed by the image processing unit 82 of the ground station 13 in the first satellite data transmission processing is executed by the image processing unit 64 of the satellite 21 in the second satellite data transmission processing.

In the second satellite data transmission processing of FIG. 13, an example has been described in which feature amount data of one type of satellite image (complete data) is generated and transmitted to the ground station 13. However, in a case where the satellite 21 includes image sensors of different types such as monochrome/color and R/IR, processing of generating and transmitting the feature amount data can be performed for a satellite image of each of the plurality of image sensors.

<Application Example of Second Satellite Data Transmission Processing>

A specific example will be described in which the satellite 21 executes the recognition processing and generates feature amount data in the second satellite data transmission processing.

Agriculture

The satellite 21 can execute detection of a vegetation status such as the NDVI as the recognition processing, and store and transmit, as the feature amount data, data indicating a peculiar point in an NDVI image or the like, for example, data in which a peculiar pattern suggesting an occurrence of an insect pest is detected. Data indicating a feature state satisfying a certain criterion, such as data in which a peculiar pattern in an NDVI image or the like is detected, can also be used as the feature amount data.

Ocean

The satellite 21 can execute processing of detecting a position of a ship as the recognition processing on the satellite image obtained by image-capturing of a certain area of the ocean, and store and transmit the recognition result as the feature amount data.

The satellite 21 can detect a distribution of a seawater temperature by the recognition processing, and store and transmit a recognition result as the feature amount data. Furthermore, data indicating a feature state satisfying a certain criterion, such as data in which a peculiar pattern is detected in a distribution of a seawater temperature itself or a distribution of a change amount, can also be used as the feature amount data.

Urban Development

The satellite 21 can compare a captured satellite image with a base image stored inside, extract a change point due to an appearance of a road or a building, and store and transmit information indicating the change point as the feature amount data. The base image at this time can be, for example, a satellite image captured about a certain period (in the past) before the time of capturing a satellite image, for an image-capturing area of the captured satellite image.

Economic Indicator

The satellite 21 can recognize the number of parked vehicles and the like in a predetermined parking lot as a recognition target region from a captured satellite image, and store and transmit a recognition result as the feature amount data.

<6. Third Satellite Data Transmission Processing>

Next, third satellite data transmission processing will be described.

Fixed point observation is performed by a sensor device (IoT sensor) installed on the ground.

Figure 14:
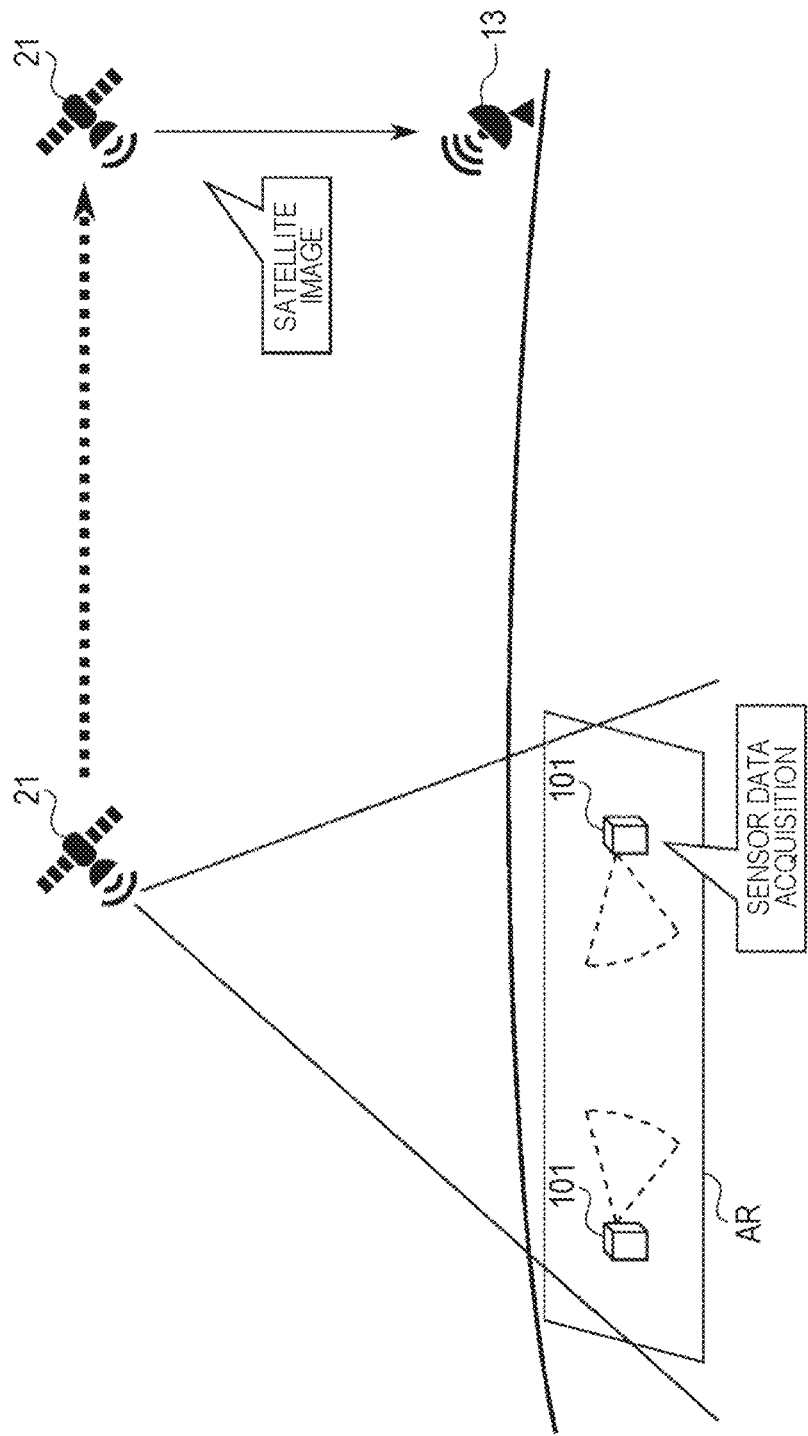
FIG. 14 is a diagram for explaining fixed point observation by a sensor device.

For example, as illustrated in FIG. 14, a sensor device 101 is installed in an area AR which is an image-capturing target area of the satellite 21. When the area AR is a farmland, the sensor device 101 detects a temperature or the like of the farmland, monitors a growth status of crops, and collects micro sample data. The sensor data detected by the sensor device 101 is generally collected via a network on the ground.

However, the sensor device 101 may be placed in a region that is not connected to a communication line on the ground, such as an ocean region or a mountainous region. In such a case, the sensor data may be collected by store and forward via satellite 21.

Figure 15:
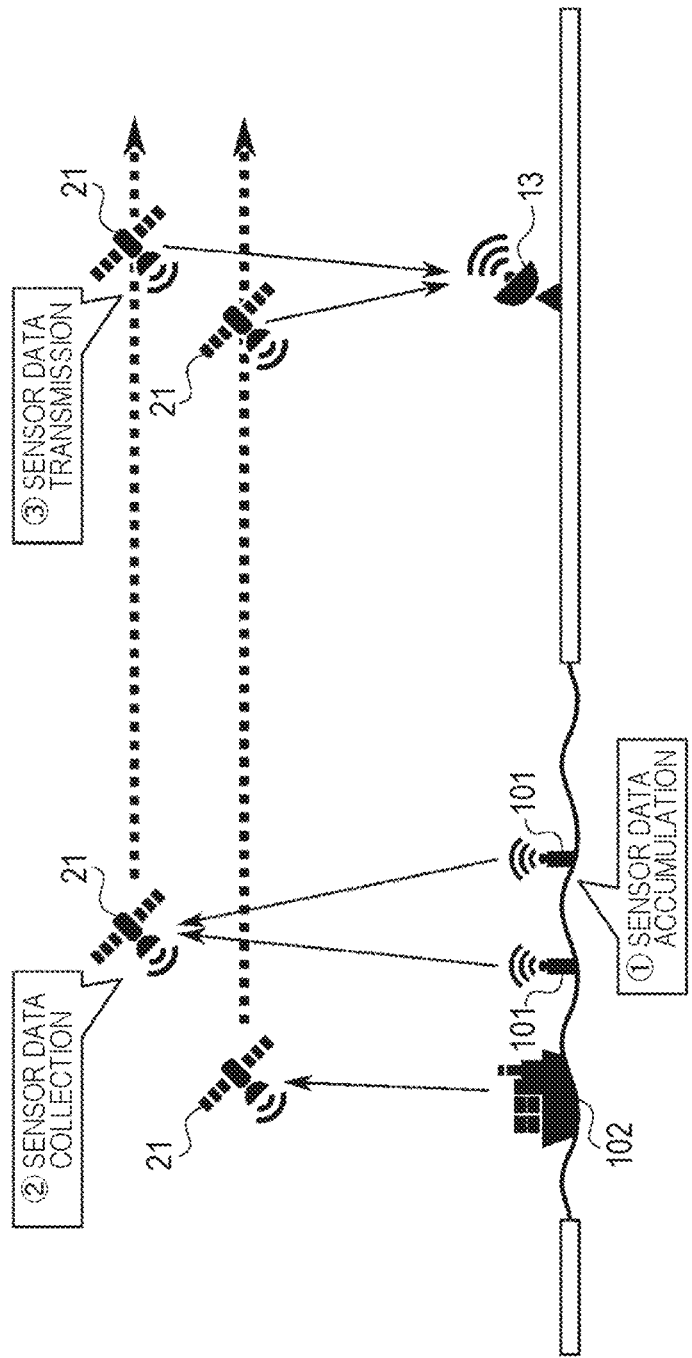
FIG. 15 is a diagram for explaining collection of sensor data through store and forward.

FIG. 15 is a diagram for explaining collection of sensor data through the store and forward.

A sensor device installed on a ship 102 on the ocean or the sensor device 101 installed on a buoy or the like acquires sensor data at a predetermined timing and accumulates the sensor data inside.

The sensor device 101 transmits the accumulated sensor data to the satellite 21 at a timing when the satellite 21 passes in the sky above the sensor device 101. The satellite 21 collects sensor data transmitted from the sensor devices 101.

Thereafter, when passing in the sky above the ground station 13, the satellite 21 transmits the sensor data stored inside, to the ground station 13. The sensor data collected by the store and forward is transferred to an analysis device (for example, the satellite management device 11) that analyzes observation data.

Figure 16:
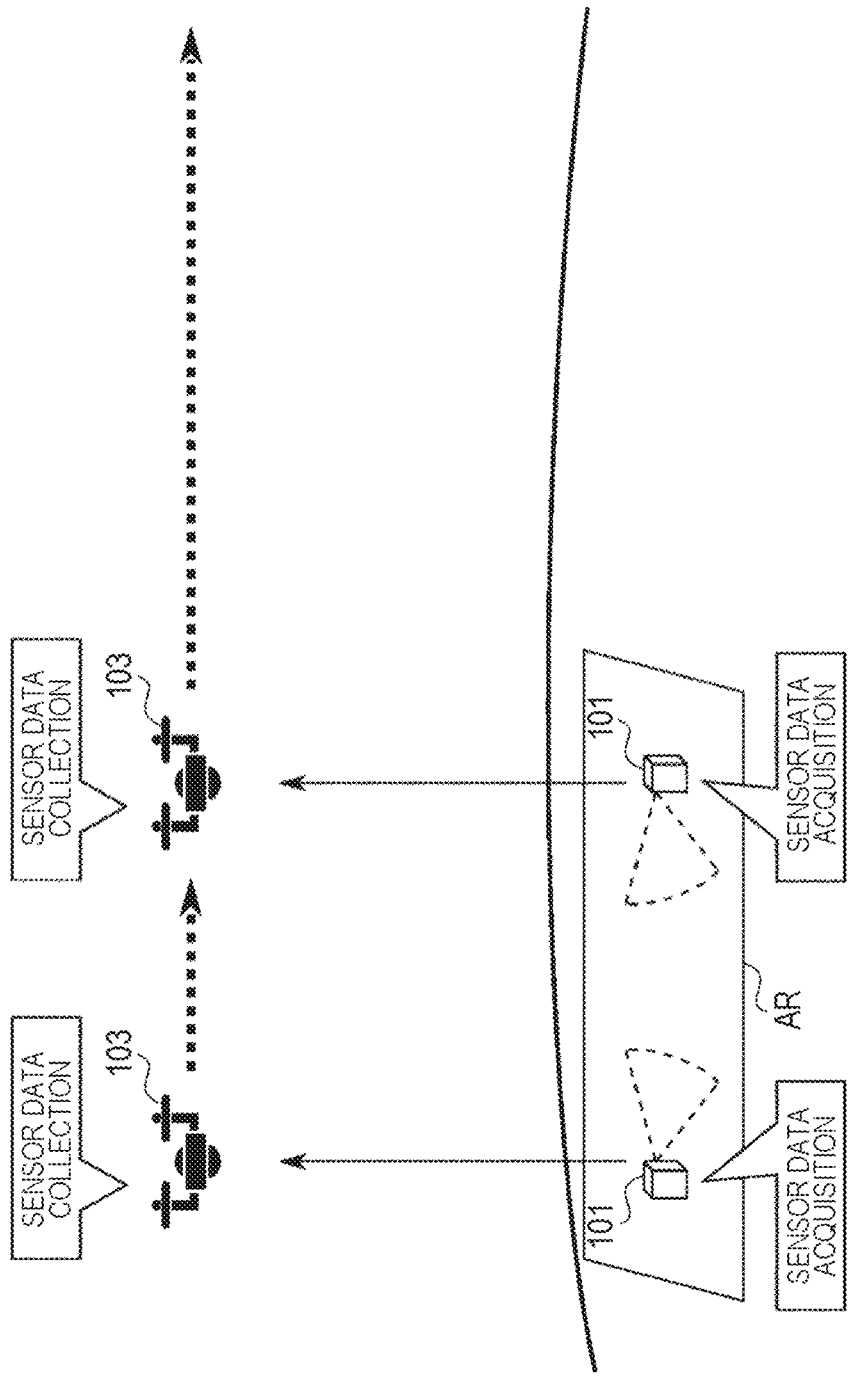
FIG. 16 is a diagram for explaining collection of sensor data through a drone.

Furthermore, as a collection method for sensor data of the sensor device 101 placed in a region that is not connected to the communication line on the ground, for example, as illustrated in FIG. 16, there is also a method of causing a drone 103 (an unmanned aircraft) to fly within a communication range of the sensor device 101 and causing the drone 103 to collect sensor data.

Since the sensor device 101 arranged in the ocean, a mountainous region, outdoors, or a remote area is driven by a battery for a long time, there are many cases where there are restrictions on a storage device and communication conditions, and it is often difficult to store and communicate a large amount of data. Therefore, efficient data transmission is required for communication between the sensor device 101 and a data collection device that collects sensor data, such as the satellite 21 and the drone 103. Furthermore, the sensor device 101 is required to efficiently store sensor data.

Hereinafter, storage and transmission of sensor data efficiently using the resources of the sensor device 101 will be described, with an example of a case where the data collection device that collects sensor data is the satellite 21.

Figure 17:
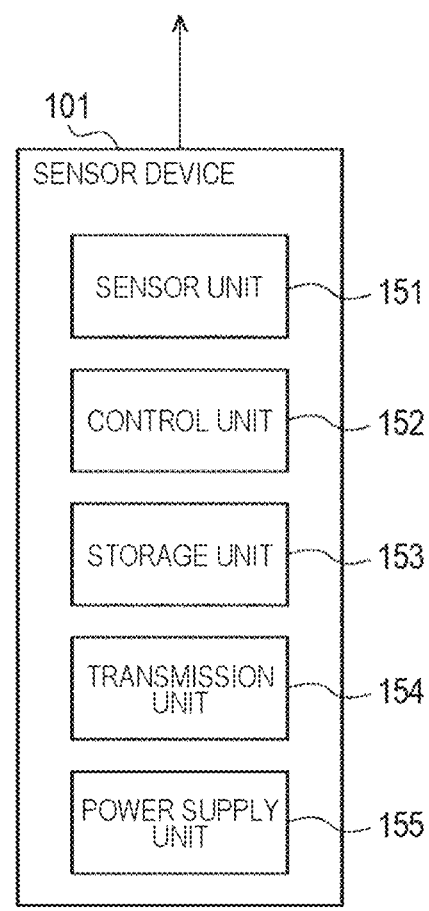
FIG. 17 is a block diagram illustrating a configuration example of the sensor device.

FIG. 17 is a block diagram illustrating a configuration example of the sensor device 101 in a case where the sensor device 101 itself has a transmission function.

The sensor device 101 includes a sensor unit 151, a control unit 152, a storage unit 153, a transmission unit 154, and a power supply unit 155.

The sensor unit 151 includes one or more types of predetermined sensors according to the purpose of detection. For example, the sensor unit 151 includes an odor sensor, an atmospheric pressure sensor, and a temperature sensor. Furthermore, for example, the sensor unit 151 may include an image sensor (an RGB sensor, an IR sensor, or the like). A plurality of sensors of the same type or different types may be mounted on the sensor unit 151.

The control unit 152 controls the entire operation of the sensor device 101. In a case where predetermined sensor data is detected by the sensor unit 151, the control unit 152 executes predetermined data processing on the detected sensor data. For example, as the data processing, the control unit 152 can perform processing of extracting, as an event, a peculiar point or a predetermined change amount of the sensor data. Furthermore, in a case where the sensor data is data of a sensor image output by the image sensor, the control unit 152 can also perform, as data processing, the above-described compression processing, feature amount conversion processing, subsample extraction processing, image recognition processing, and the like. The control unit 152 causes the sensor data or processed data after the data processing to be temporarily stored in the storage unit 153, and to be transmitted from the transmission unit 154 to a predetermined data collection device.

Under the control of the control unit 152, the transmission unit 154 transmits the accumulated sensor data or processed data to the data collection device by predetermined wireless communication. A method of wireless communication is not limited, but is, for example, wireless communication or the like capable of performing long-distance communication of 100 km or more with respect to a high-speed mobile object at 100 km/h is used, in a case where the data collection device is the satellite 21.

The power supply unit 155 includes, for example, a battery or the like charged by solar power generation or the like, and supplies power to each unit of the sensor device 101.

The sensor device 101 is mounted with, for example, self-power generation or a long-life battery, and can store large-amount sensor data in the storage unit 153. Although an information amount obtained by one sensor device 101 is small, for example, it is possible to obtain high-order information by integrating sensor data of a plurality of sensor devices 101 in the entire area or accumulating data for a long period of time.

In a case where the sensor included in the sensor device 101 is an image sensor (a camera), and the power source depends on self-power generation or a long-life battery, only an extremely low-resolution image can be captured in many cases. However, a high-resolution image can be obtained in a non-network connection region having a power supply. For example, in a mountain base, a ship, an ocean buoy and pipeline in which a certain amount of power generation is expected, and the like, the sensor device 101 having a power source can be installed.

As described above, in addition to the configuration in which the sensor data is transmitted from the individual sensor device 101, a configuration may be adopted in which the sensor data of the plurality of sensor devices 101 are aggregated and transmitted.

Figure 18:
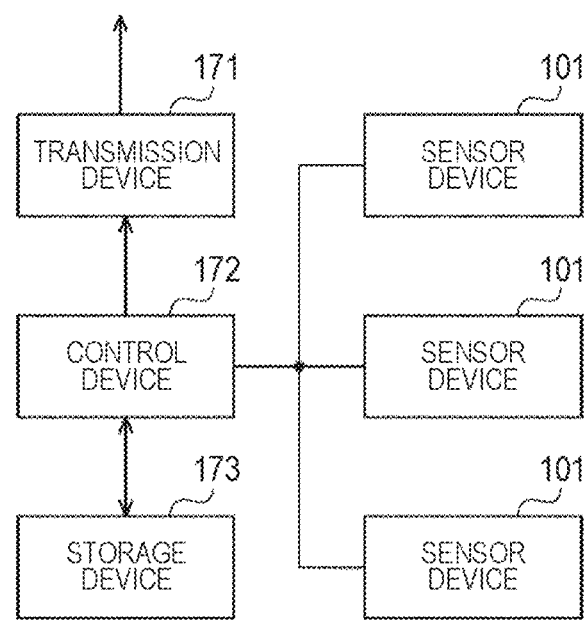
FIG. 18 is a block diagram illustrating a configuration example of a case where sensor data of a plurality of sensor devices is aggregated and transmitted.

FIG. 18 illustrates a device configuration example in such a case, in which a plurality of sensor devices 101 (three in the example of FIG. 18) is connected to a control device 172, and the control device 172 is also connected to a transmission device 171 and a storage device 173. The transmission device 171, the control device 172, and the storage device 173 may be configured as one device.

Under the control of the control device 172, the transmission device 171 transmits one or more pieces of sensor data (a sensor data group) to the data collection device by predetermined wireless communication.

The control device 172 acquires sensor data detected by the plurality of sensor devices 101, and causes the acquired sensor data to be stored in the storage device 173. The control device 172 causes the transmission device 171 to transmit the one or more pieces of sensor data (the sensor data group) stored in the storage device 173 at a predetermined timing at which wireless communication with the data collection device is possible.

The storage device 173 stores the one or more pieces of sensor data (the sensor data group) until the transmission.

In FIG. 18, three sensor devices 101 are connected to the control device 172, but the number of sensor devices 101 may be freely determined. The plurality of sensor devices 101 may be devices that acquire the same type of sensor data or devices that acquire different types of sensor data.

With reference to a flowchart of FIG. 19, the third satellite data transmission processing of performing efficient data transmission between the sensor device 101 and the satellite 21 will be described. Note that, in flowcharts of FIGS. 19 and 20, description will be given on the assumption that a sensor included in the sensor device 101 is an image sensor.

Figure 19:
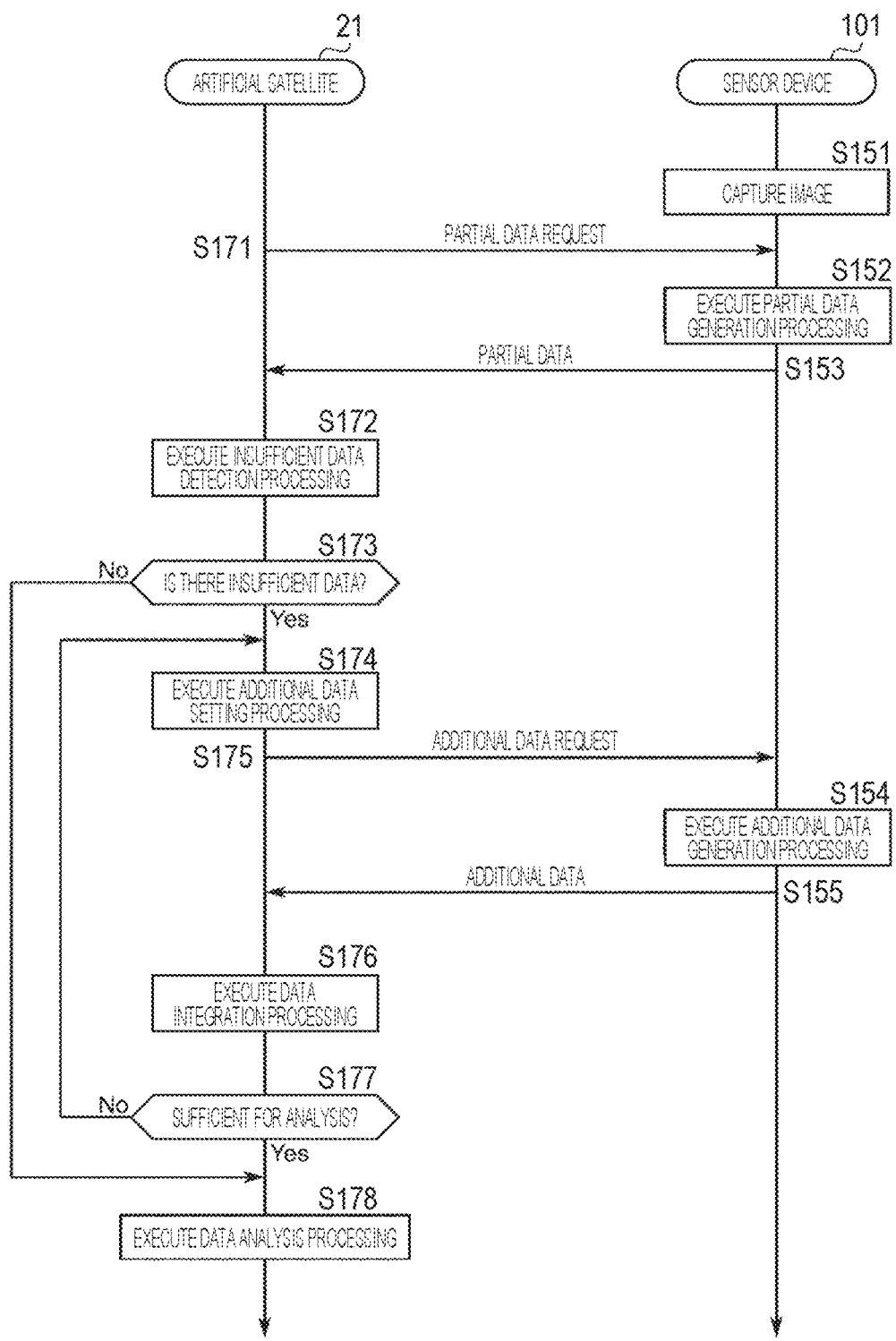
FIG. 19 is a flowchart for explaining third satellite data transmission processing.

The third satellite data transmission processing illustrated in FIG. 19 corresponds to processing in which the processing performed by the ground station 13 and the satellite 21 in the first satellite data transmission processing illustrated in FIG. 5 is replaced with the satellite 21 and the sensor device 101.

That is, the ground station 13 in FIG. 5 corresponds to the satellite 21 in FIG. 19, and the satellite 21 in FIG. 5 corresponds to the sensor device 101 in FIG. 19. The processing in steps S71 to S78 of the ground station 13 in FIG. 5 is performed as steps S171 to S178 by the satellite 21 in FIG. 19, and the processing of steps S51 to S55 of the satellite 21 in FIG. 5 is performed as steps S151 to S155 by the sensor device 101 in FIG. 19. Since the processing of each step in FIG. 19 is similar to the processing of the corresponding step in FIG. 5, the description will be simplified below.

In step S151, the sensor device 101 captures an image of a monitoring target area at a predetermined timing. The processing of step S151 may be performed a plurality of times before the next step S171 is executed. The sensor image obtained here by the sensor device 101 before reduction, thinning, or the like is performed is also referred to as complete data of the sensor image in comparison with partial data.

In step S171, the satellite 21 transmits, to the sensor device 101, a partial data request for requesting partial data of a sensor image obtained by image-capturing. Details of the partial data are similar to those of the first satellite data transmission processing.

In step S152, the sensor device 101 receives the partial data request from the satellite 21, and executes partial data generation processing of generating partial data of the sensor image. Then, in step S153, the sensor device 101 transmits the generated partial data to the satellite 21 as a response to the partial data request from the satellite 21.

In step S172, the satellite 21 receives the partial data transmitted from the sensor device 101, and executes insufficient data detection processing of detecting whether there is insufficient data. Details of the insufficient data detection processing are similar to those in FIG. 5, and thus, are omitted.

In step S173, the satellite 21 determines whether there is insufficient data as a result of the insufficient data detection processing, and the processing proceeds to step S174 when it is determined that there is insufficient data. Whereas, when it is determined that there is no insufficient data, the processing proceeds to step S178 described later.

When it is determined in step S173 that there is insufficient data, the satellite 21 executes additional data setting processing of setting additional data in step S174, and transmits an additional data request for requesting additional data to the sensor device 101 in step S175.

In step S154, the sensor device 101 receives the additional data request from the satellite 21, and executes additional data generation processing of generating additional data.

Then, in step S155, the sensor device 101 transmits the generated additional data to the satellite 21 as a response to the additional data request.

In step S176, the satellite 21 executes data integration processing of integrating the partial data acquired first and the additional data acquired thereafter.

In step S177, the satellite 21 determines whether integrated data obtained by integrating the partial data acquired first and the additional data acquired thereafter is sufficient for performing data analysis. The processing of step S177 is similar to the insufficient data detection processing of determining whether or not there is insufficient data.

When it is determined in step S177 that it is not yet sufficient to perform data analysis, the processing returns to step S174, and the processing of steps S174 to S177 described above is repeated. That is, the satellite 21 further requests and acquires additional data.

Whereas, when it is determined in step S177 that it is sufficient for performing data analysis, the processing proceeds to step S178, and the satellite 21 executes data analysis processing using the integrated data or the partial data acquired from the sensor device 101. The data analysis processing may be performed by the ground station 13 or the satellite management device 11 after being transmitted to the ground station 13.

As described above, in the third satellite data transmission processing of FIG. 19, first, partial data of a sensor image obtained by the sensor device 101 is transmitted to the satellite 21. In a case where it is determined that there is insufficiency in the partial data, additional data is dynamically requested to the sensor device 101 and acquired. As a result, since only data necessary for data analysis is transmitted between the sensor device 101 and the satellite 21, a communication time and a data amount can be suppressed, and data can be efficiently transmitted.

<Another Example of Third Satellite Data Transmission Processing>

With reference to the flowchart of FIG. 20, another example of the third satellite data transmission processing will be described.

Figure 20:
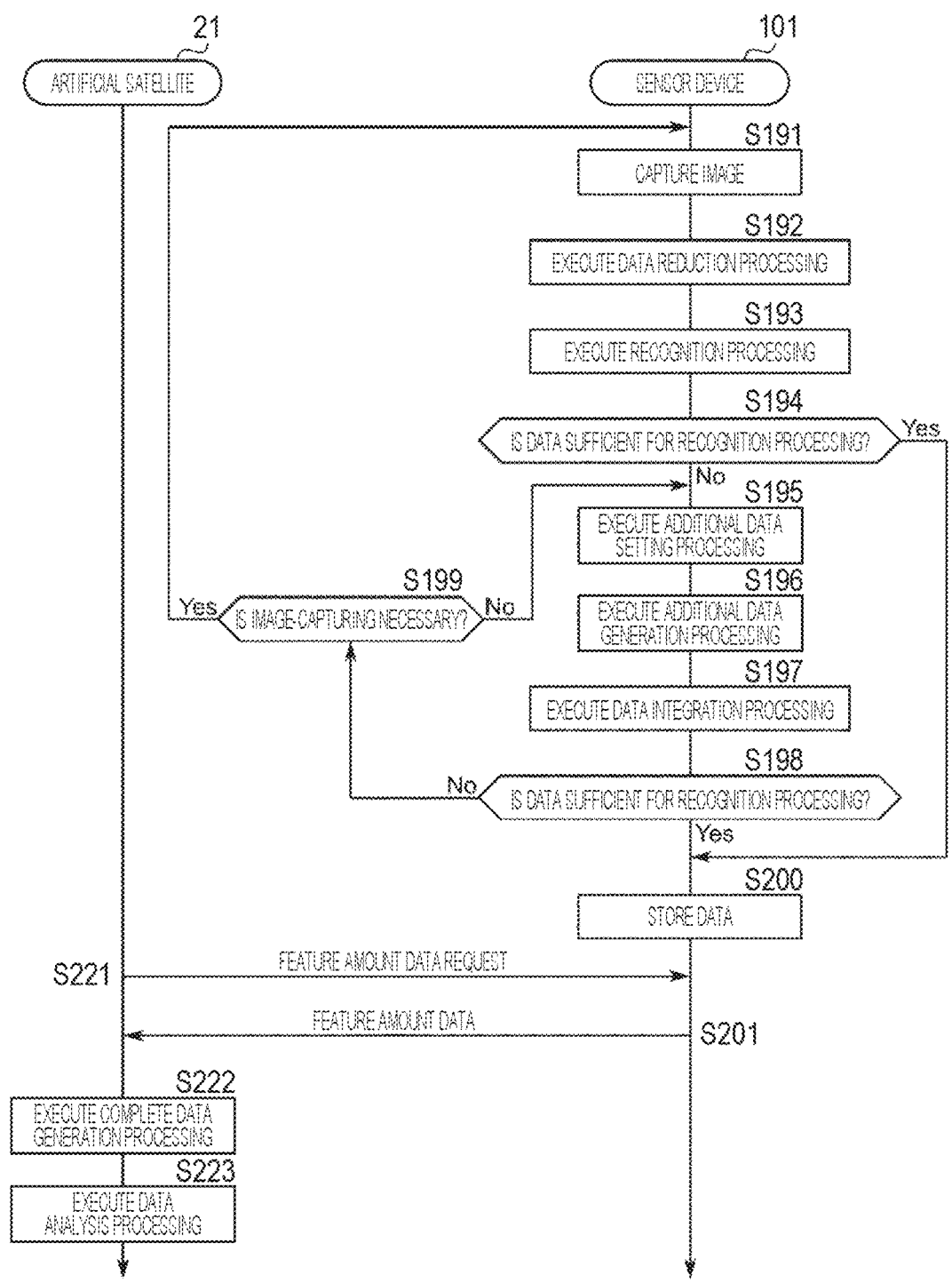
FIG. 20 is a flowchart for explaining another example of the third satellite data transmission processing.

The third satellite data transmission processing illustrated in FIG. 20 corresponds to processing in which the processing performed by the ground station 13 and the satellite 21 in the second satellite data transmission processing illustrated in FIG. 13 is replaced with the satellite 21 and the sensor device 101.

That is, the ground station 13 in FIG. 13 corresponds to the satellite 21 in FIG. 20, and the satellite 21 in FIG. 13 corresponds to the sensor device 101 in FIG. 20. The processing in steps S121 to S123 of the ground station 13 in FIG. 13 is performed as steps S221 to S223 by the satellite 21 in FIG. 20, and the processing of steps S91 to S101 of the satellite 21 in FIG. 13 is performed as steps S191 to S201 by the sensor device 101 in FIG. 20. Since the processing of each step in FIG. 20 is similar to the processing of the corresponding step in FIG. 13, the description will be simplified below.

First, in step S191, the sensor device 101 captures an image of a monitoring target area at a predetermined timing. The processing of step S91 may be performed a plurality of times before the next step S192 is executed. By the image-capturing, complete data of the sensor image is obtained.

In step S192, the sensor device 101 executes data reduction processing of reducing a data amount by converting the complete data of the sensor image into predetermined feature amount data. Details of the data reduction processing are similar to the processing in step S92 in FIG. 13, and thus are omitted.

In step S193, the sensor device 101 executes recognition processing by using the feature amount data generated by the data reduction processing. Details of this recognition processing are similar to the processing in step S93 in FIG. 13, and thus are omitted.

In step S194, the sensor device 101 determines whether the generated feature amount data is data sufficient for the recognition processing as a result of the recognition processing. When it is determined in step S194 that the feature amount data is sufficient data for the recognition processing, the processing proceeds to step S200 described later.

Whereas, when it is determined in step S194 that the feature amount data is not data sufficient for the recognition processing, the processing proceeds to step S195, and the sensor device 101 executes additional data setting processing of setting additional feature amount data, and executes additional data generation processing of generating additional feature amount data in step S196. Subsequently, in step S197, the sensor device 101 executes data integration processing of integrating the feature amount data generated first and the additional feature amount data generated thereafter.

Then, in step S198, the sensor device 101 determines whether the integrated feature amount data is data sufficient for the recognition processing. The processing of step S198 is similar to the determination processing of step S194 described above. The determination in step S198 may be made after the recognition processing similar to that in step S193 is performed as necessary.

When it is determined in step S198 that the integrated feature amount data is not data sufficient for the recognition processing, the processing proceeds to step S199, and the sensor device 101 determines whether image-capturing again is necessary. For example, in a case where a sufficient recognition result cannot be obtained in the generated feature amount data due to insufficient resolution of the sensor image, there is a limit to improvement of the recognition result no matter how much the feature amount data is generated on the basis of the current sensor image. In such a case, it is necessary to change the resolution (increase the resolution) and perform image-capturing again. Alternatively, in a case where it is determined by the recognition processing that details of a specific area of the current sensor image are necessary, it is necessary to perform image-capturing again by zooming to the specific area.

When it is determined in step S199 that image-capturing again is necessary, the processing returns to step S191, and the processing in and after step S191 described above is executed again. That is, image-capturing of the monitoring target area, generation of predetermined feature amount data from the sensor image obtained by the image-capturing, and the like are executed.

Whereas, when it is determined in step S199 that image-capturing again is not necessary, the processing returns to step S195, and the processing in and after step S195 described above is executed again. That is, generation of additional feature amount data, data integration processing of the generated feature amount data and feature amount data previously generated, and the like are executed.

Whereas, when it is determined in step S198 described above that the integrated feature amount data is sufficient data for the recognition processing, the processing proceeds to step S200, and the sensor device 101 performs data storage of the generated feature amount data. As a result, the generated feature amount data or the feature amount data after the integration processing in a case where the data integration processing is performed is stored in the storage unit 153 or the storage device 173, and the original sensor image is not stored.

In step S221, at a timing of passing in the sky above the sensor device 101, the satellite 21 transmits a feature amount data request for requesting feature amount data to the sensor device 101.

In step S201, the sensor device 101 receives the feature amount data request from the satellite 21, and transmits the feature amount data stored in the storage unit 153 or the like to the satellite 21 as a response.

In step S222, the satellite 21 receives the feature amount data transmitted from the sensor device 101, executes complete data generation processing by using the received feature amount data and complementing data, and generates complete data for analysis processing. The complementing data is prepared in advance in the satellite 21.

In step S223, the satellite 21 executes data analysis processing of performing analysis based on the generated complete data for analysis processing. A result of the data analysis processing is stored in the storage unit 65, and then transmitted to the ground station 13 at a time of passing in the sky above the ground station 13.

The complete data generation processing in step S222 and the data analysis processing in step S223 may be performed by the ground station 13 or the satellite management device 11.

As described above, in the third satellite data transmission processing of FIG. 20, the sensor device 101 assumingly creates and stores in advance the feature amount data necessary for the recognition processing, and transmits the feature amount data to the satellite 21. The sensor image, which is the original data of the feature amount data, is not stored. As a result, the information amount can be compressed (reduced), and the resources of the sensor device 101 can be efficiently used. Since the generated feature amount data is data necessary for the recognition processing, it is possible to store information that is to be dropped in the feature amount conversion for visualization. The satellite 21, the ground station 13, or the satellite management device 11 on the side where the recognition processing is performed can perform highly accurate or various types of recognition processing on the basis of the feature amount.

In the third satellite data transmission processing of FIG. 20, in a case where the feature amount data necessary for the recognition processing cannot be obtained from the first acquired sensor image, image-capturing can be performed again, and the feature amount data can be prepared on the basis of a sensor image captured under a new image-capturing condition. As a result, data necessary for recognition processing can be efficiently acquired and transmitted.

Also in the third satellite data transmission processing of FIGS. 19 and 20, in a case where the sensor device 101 includes different types of image sensors, processing of generating and transmitting feature amount data for a sensor image of each of the plurality of image sensors can be performed.

<Application Example of Third Satellite Data Transmission Processing>

A specific example of feature amount data generated by the sensor device 101 in the third satellite data transmission processing will be described.

Agriculture

With a farmland as the monitoring target area, a temperature change, a feature change of soil, a state change of a sample crop, and the like at each observation point installed in the farmland can be detected as an event and used as the feature amount data.

Ocean

With the ocean as the monitoring target area, the sensor device 101 provided in an ocean buoy or the like can detect a change in a fish group in the ocean, a change in seawater temperature, or the like as an event, and use as the feature amount data. Changes in seawater temperature, atmospheric pressure, wave height, and the like detected by the sensor device 101 installed in a ship anchoring in the monitoring target area or navigating in the monitoring target area can be detected as events and used as the feature amount data.

Other

The sensor device 101 installed in a pipeline can detect a temperature (heat detection) around the device, detect a change thereof or the like as an event, and use as the feature amount data. Distribution data and the like of gas leakage obtained by a large number of sensor devices 101 arranged in the monitoring target area can be used as the feature amount data.

<7. Recognition Processing of Subsampled Image>

With reference to FIGS. 21 to 31, a specific example of recognition processing using an image (a subsampled image) that has been subsampled will be described.

Note that, in the description of FIGS. 21 to 31, it is assumed that the image processing unit 82 of the ground station 13 performs recognition processing on a plurality of images that has been subsampled. However, in accordance with the first to third satellite data transmission processing described above, any of the satellite 21, the satellite management device 11, or the sensor device 101 may perform the recognition processing.

Figure 21:
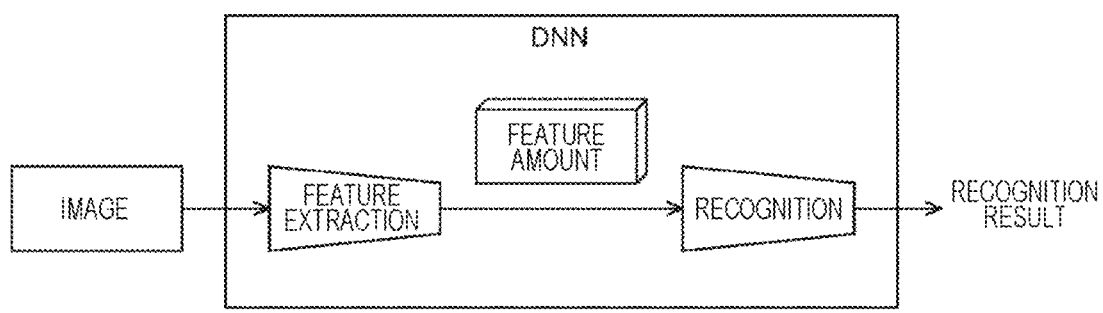
FIG. 21 is a diagram for explaining recognition processing using a subsampled image.

FIG. 21 illustrates a conceptual diagram of recognition processing of a plurality of subsampled images.

As illustrated in FIG. 21, the recognition processing of a plurality of subsampled images can be executed by feature extraction processing and recognition processing using a deep neural network (DNN). Specifically, the image processing unit 82 extracts a feature amount by the feature extraction processing on an input image using the DNN. This feature extraction processing is performed using a convolutional neural network (CNN) of the DNN, for example. Furthermore, the image processing unit 82 executes the recognition processing on the extracted feature amount by using the DNN, and obtains a recognition result.

Figure 22:
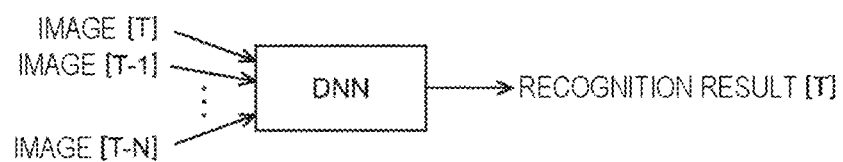
FIG. 22 is a diagram for explaining recognition processing using a subsampled image.

As illustrated in FIG. 22, the recognition processing with the DNN can be executed by sequentially inputting time-series images [T−2], [T−1], [T], • • • . Here, the image [T] is a subsampled image at a time T, the image [T−1] is a subsampled image at a time T−1 before the time T, and the image [T−2] is a subsampled image at a time T−2 before the time T−1. The image processing unit 82 executes recognition processing on each of the input images [T−2], [T−1], [T], • • • by using the DNN, and obtains a recognition result [T] at the time T.

Figure 23:
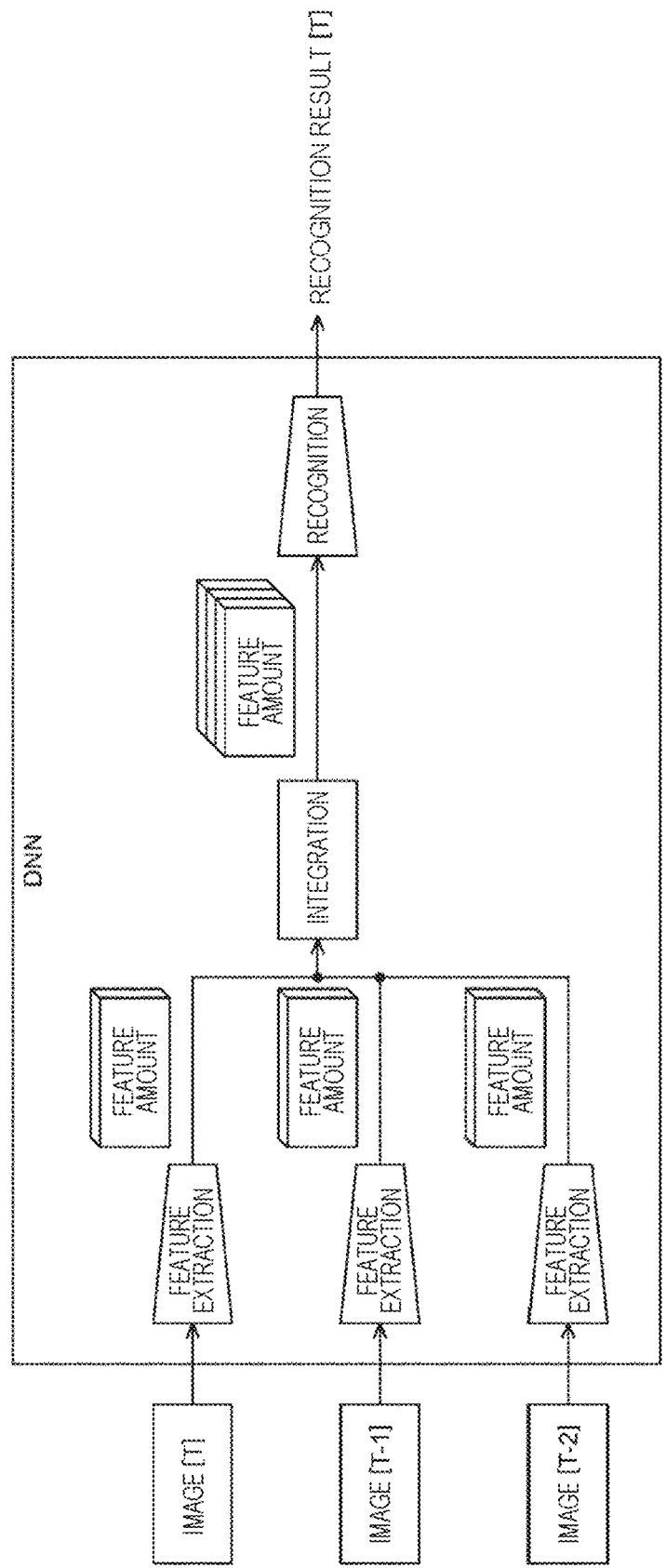
FIG. 23 is a diagram for explaining recognition processing using a subsampled image.

FIG. 23 is a more detailed conceptual diagram of the recognition processing of FIG. 22.

As illustrated in FIG. 23, the image processing unit 82 executes the feature extraction processing described with reference to FIG. 21 on a one-to-one basis on each of the input images [T], [T−1], and [T−2], for example, and extracts feature amounts respectively corresponding to the images [T], [T−1], and [T−2]. The image processing unit 82 integrates the individual feature amounts obtained on the basis of these images [T], [T−1], and [T−2], executes the recognition processing on the integrated feature amounts, and obtains the recognition result [T] at the time T. It can be said that the individual feature amounts obtained on the basis of the images [T], [T−1], and [T−2] are intermediate data for obtaining integrated feature amounts to be used for the recognition processing.

Figure 24:
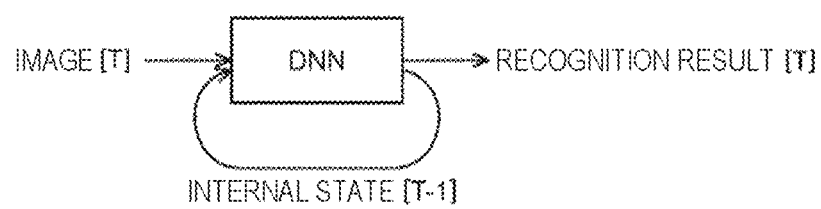
FIG. 24 is a diagram for explaining recognition processing using a subsampled image.

FIG. 24 is another conceptual diagram of the recognition processing with the DNN.

As illustrated in FIG. 24, the recognition processing of the plurality of sub-sampled images can also be understood that, in a case where the images [T−2], [T−1], [T], • • • are input in time series, the image [T] at the time T is input to the DNN whose internal state has been updated to the state at the time T−1, and the recognition result [T] at the time T is obtained.

Figure 25:
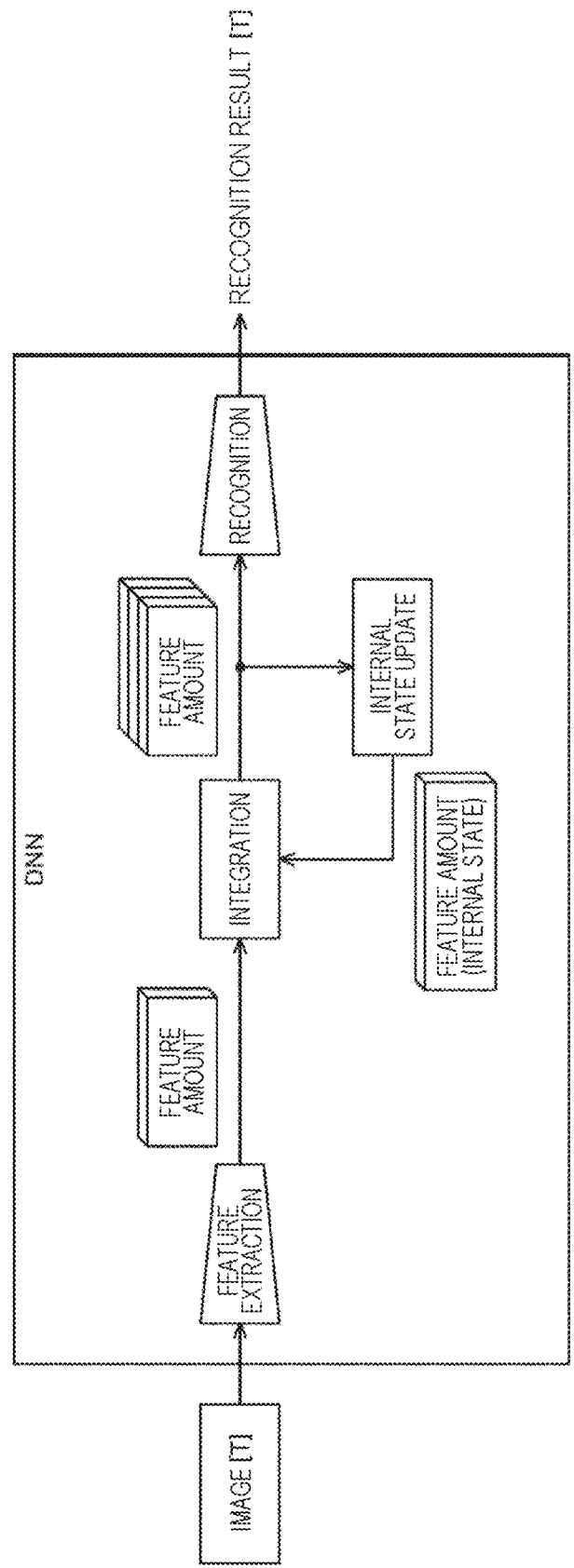
FIG. 25 is a diagram for explaining recognition processing using a subsampled image.

FIG. 25 is a more detailed conceptual diagram of the recognition processing of FIG. 24.

As illustrated in FIG. 25, the image processing unit 82 executes the feature extraction processing described with reference to FIG. 21 on the input image [T] at the time T, and extracts a feature amount corresponding to the image [T]. In the image processing unit 82, an internal state is updated by an image before the time T, and a feature amount related to the updated internal state is stored. The image processing unit 82 integrates the stored feature amount related to the internal state and the feature amount in the image [T], executes recognition processing on the integrated feature amount, and obtains the recognition result [T] at the time T. In this case, each of the stored feature amount related to the internal state and the feature amount in the image [T] can be said to be intermediate data for obtaining the integrated feature amount to be used for the recognition processing.

The recognition processing illustrated in FIGS. 22 and 24 is executed using, for example, the DNN in which an internal state has been updated by using a previous recognition result, and is recursive processing. In this way, the DNN for performing recursive processing in this manner is referred to as a recurrent neural network (RNN). The recognition processing with the RNN is generally used for moving image recognition or the like, and the recognition accuracy can be improved, for example, by sequentially updating the internal state of the DNN with frame images updated in time series.

The recognition processing using the DNN will be further described with reference to FIGS. 26 to 31.

Figure 26:
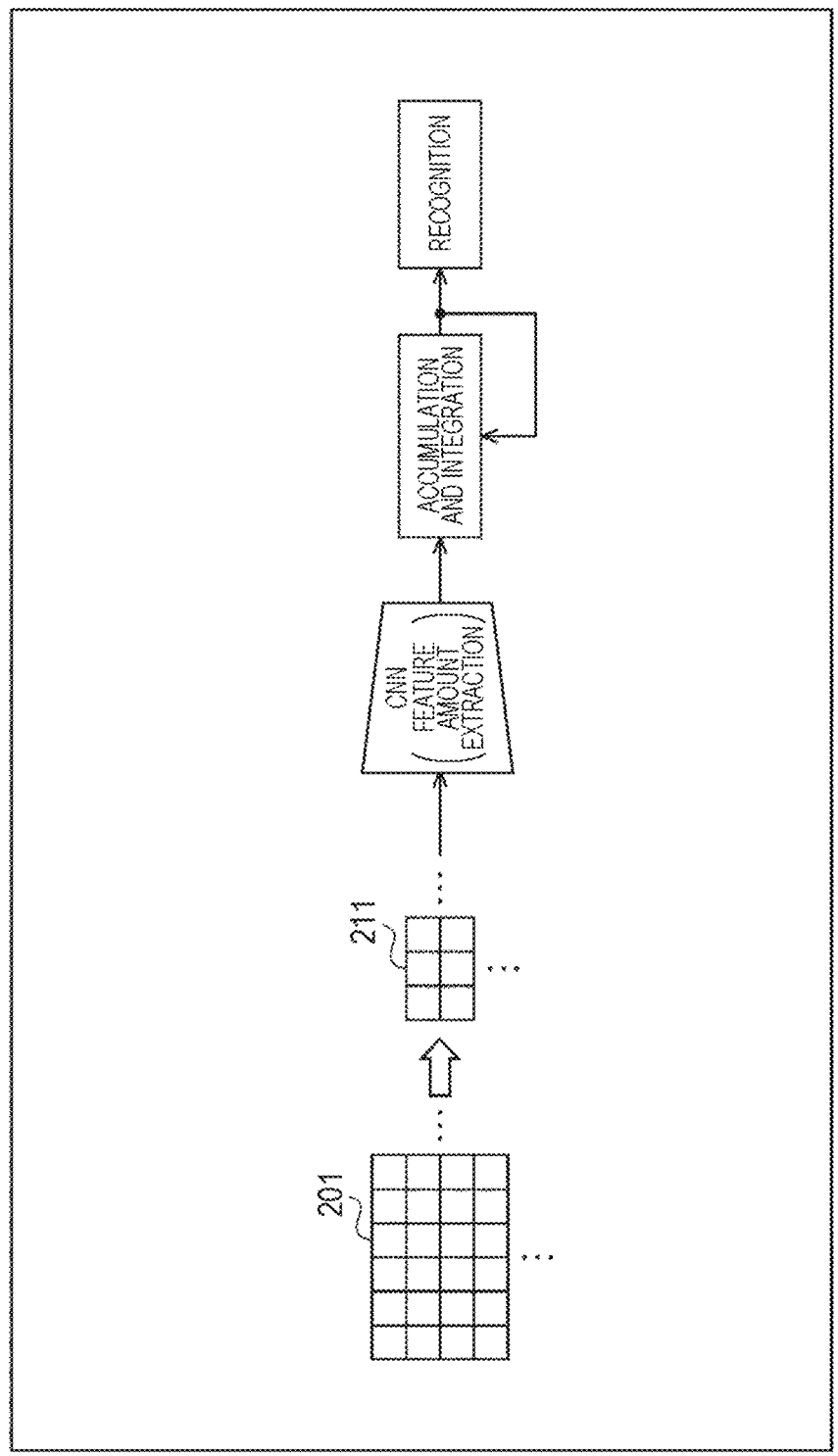
FIG. 26 is a diagram for explaining a specific example of recognition processing using a DNN.

FIG. 26 is a schematic diagram for explaining the recognition processing using the DNN.

A subsampled image 211 generated by subsampling a pixel at a predetermined pixel position with respect to a complete data image 201 in which pixels are not thinned is input to the image processing unit 82 that performs the recognition processing using the DNN.

The image processing unit 82 extracts a feature amount of the input subsampled image 211. Here, the image processing unit 82 extracts the feature amount by using the CNN in the DNN.

The image processing unit 82 stores the extracted feature amount in an accumulation unit (not illustrated). At this time, for example, in a case where a feature amount extracted in the immediately preceding frame has already been stored in the accumulation unit, the image processing unit 82 integrates the feature amount with the extracted feature amount by recursively using the feature amount stored in the accumulation unit. This processing corresponds to processing using the RNN in the DNN.

The image processing unit 82 executes the recognition processing on the basis of the accumulated and integrated feature amounts.

A specific example will be described with reference to FIGS. 27 to 30.

Figure 27:
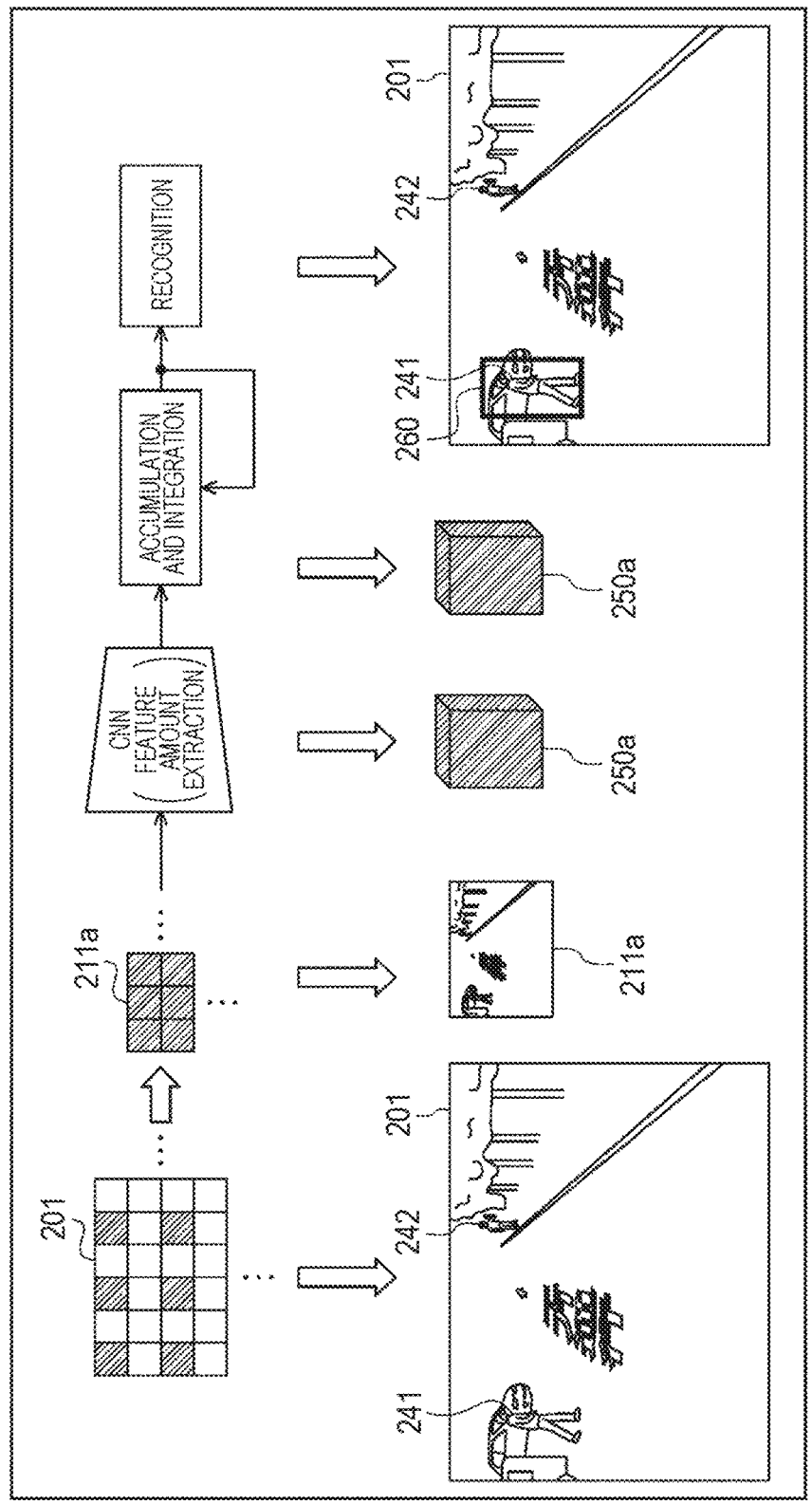
FIG. 27 is a diagram for explaining a specific example of recognition processing using the DNN.

At a predetermined time T, as illustrated in FIG. 27, a subsampled image 211a generated by subsampling a pixel at a predetermined pixel position with respect to the complete data image 201 is input to the image processing unit 82.

The complete data image 201 includes a person 241 and a person 242. The person 241 is located at a relatively short distance (referred to as a medium distance) from the camera, and the person 242 is located at a distance (referred to as a long distance) farther than the person 241 with respect to the camera and has a smaller size in the image than that of the person 241.

For example, the subsampled image 211a corresponds to an image obtained by sampling an upper left pixel of each pixel unit when the complete data image 201 is divided into four pixel units of 2×2.

The image processing unit 82 extracts a feature amount 250a of the input subsampled image 211a by using the CNN. The image processing unit 82 accumulates the extracted feature amount 250a in the accumulation unit. At this time, in a case where a feature amount is already accumulated in the accumulation unit, the feature amount 250a can be integrated with the feature amount already accumulated. However, the example of FIG. 27 illustrates a state in which the first feature amount 250a is accumulated in an empty accumulation unit.

The image processing unit 82 executes the recognition processing on the basis of the feature amount 250a accumulated in the accumulation unit. In the example of FIG. 27, the person 241 located at the medium distance is recognized and obtained as a recognition result 260. Whereas, the person 242 located at the long distance is not recognized.

Figure 28:
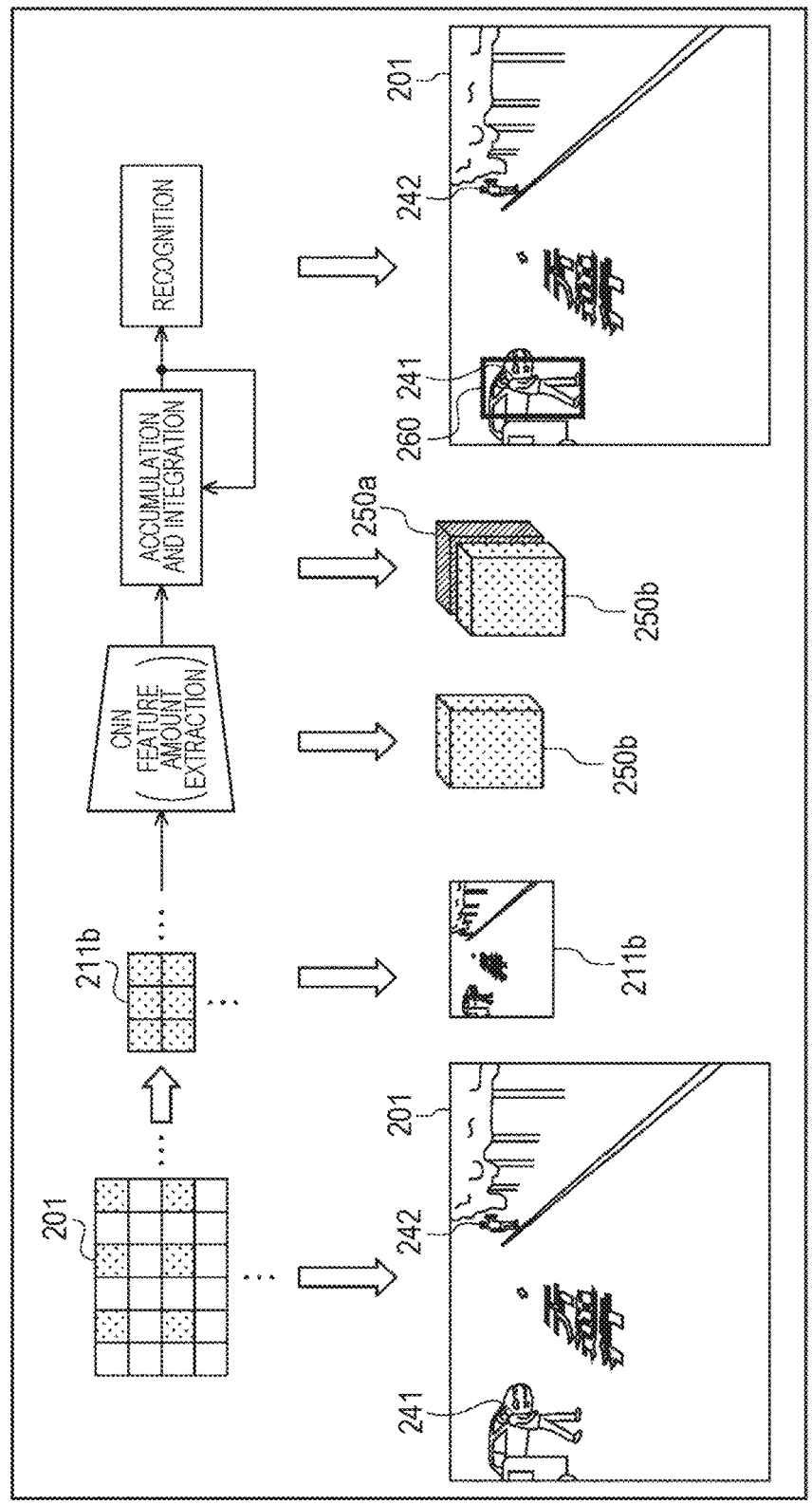
FIG. 28 is a diagram for explaining a specific example of the recognition processing using the DNN.

At a time T+1 after a lapse of a predetermined time from the time T, as illustrated in FIG. 28, a subsampled image 211b generated by subsampling a pixel at a predetermined pixel position with respect to the complete data image 201 is input to the image processing unit 82.

The subsampled image 211b corresponds to, for example, an image obtained by sampling an upper right pixel of each 2×2 pixel unit of the complete data image 201. In other words, the subsampled image 211b corresponds to an image obtained by sampling each pixel position shifted in a horizontal direction by one pixel with respect to the pixel position of the subsampled image 211a of the image 201.

The image processing unit 82 extracts a feature amount 250b of the input subsampled image 211b by using the CNN. The image processing unit 82 accumulates the extracted feature amount 250b in the accumulation unit. At this time, the feature amount 250a of the subsampled image 211a is already accumulated in the accumulation unit. Therefore, the image processing unit 82 accumulates the feature amount 250b in the accumulation unit, and integrates the feature amount 250b with the accumulated feature amount 250a.

The image processing unit 82 executes the recognition processing on the basis of the feature amount in which the feature amount 250a and the feature amount 250b are integrated. In the example of FIG. 28, the person 241 located at the medium distance is recognized and obtained as the recognition result 260, but the person 242 located at the long distance is not recognized at this time.

Figure 29:
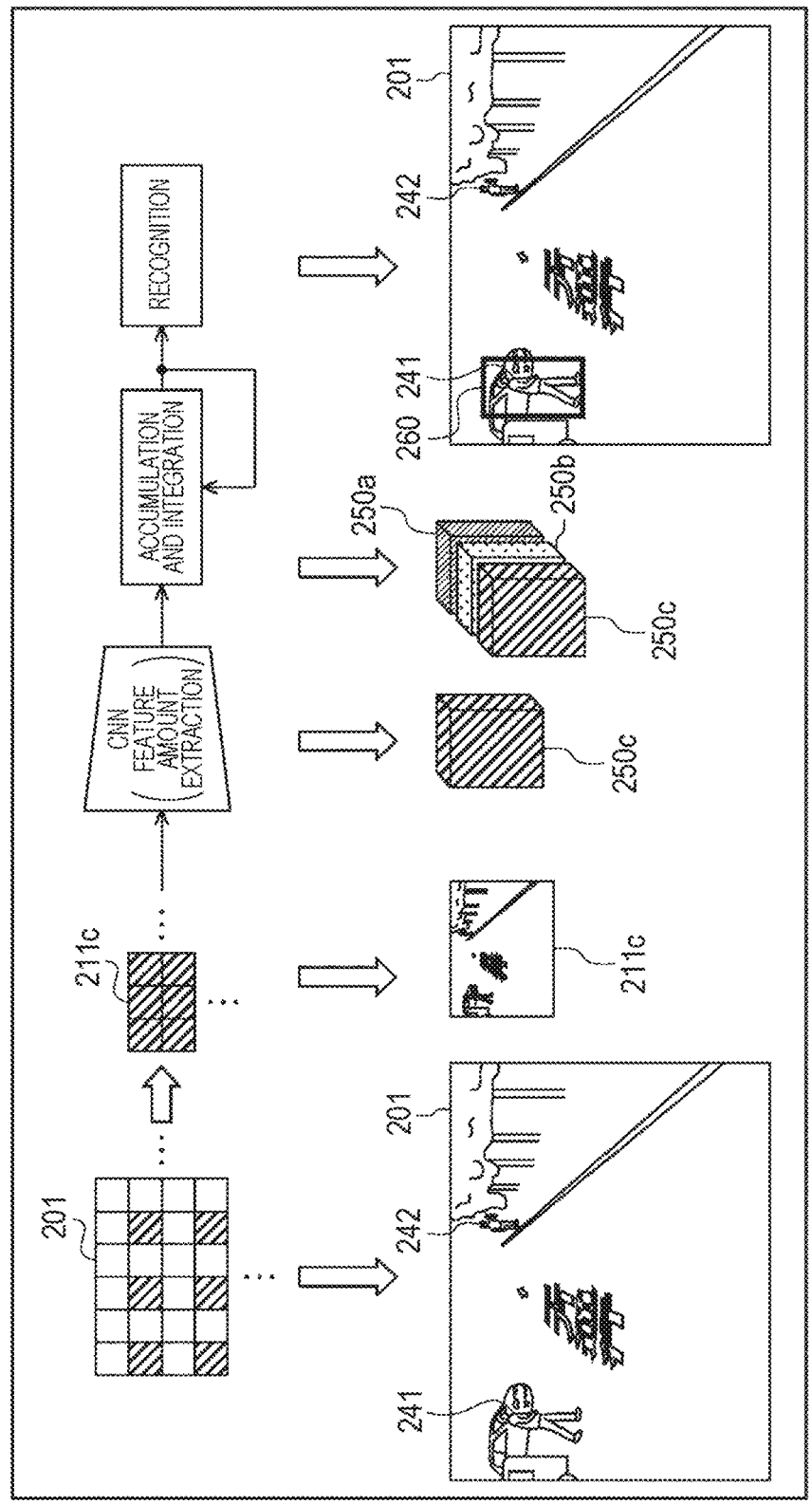
FIG. 29 is a diagram for explaining a specific example of the recognition processing using the DNN.

At a time T+2 after a lapse of predetermined time from the time T+1, as illustrated in FIG. 29, a subsampled image 211c generated by subsampling a pixel at a predetermined pixel position with respect to the complete data image 201 is input to the image processing unit 82.

The subsampled image 211c corresponds to, for example, an image obtained by sampling a lower left pixel of each 2×2 pixel unit of the complete data image 201. In other words, the subsampled image 211c corresponds to an image obtained by sampling each pixel position shifted in a column direction by one pixel with respect to the pixel position of the subsampled image 211a of the image 201.

The image processing unit 82 extracts a feature amount 250c of the input subsampled image 211c by using the CNN. The image processing unit 82 accumulates the extracted feature amount 250c in the accumulation unit. At this time, the feature amounts 250a and 250b extracted respectively from the subsampled images 211a and 211b are already accumulated in the accumulation unit. Therefore, the image processing unit 82 accumulates the feature amount 250c in the accumulation unit, and integrates the feature amount 250c with the accumulated feature amounts 250a and 250b.

The image processing unit 82 executes the recognition processing on the basis of the feature amount in which the feature amounts 250a and 250b are integrated with the feature amount 250c. In the example of FIG. 29, the person 241 located at the medium distance is recognized and obtained as the recognition result 260, but the person 242 located at the long distance is not recognized at this time.

Figure 30:
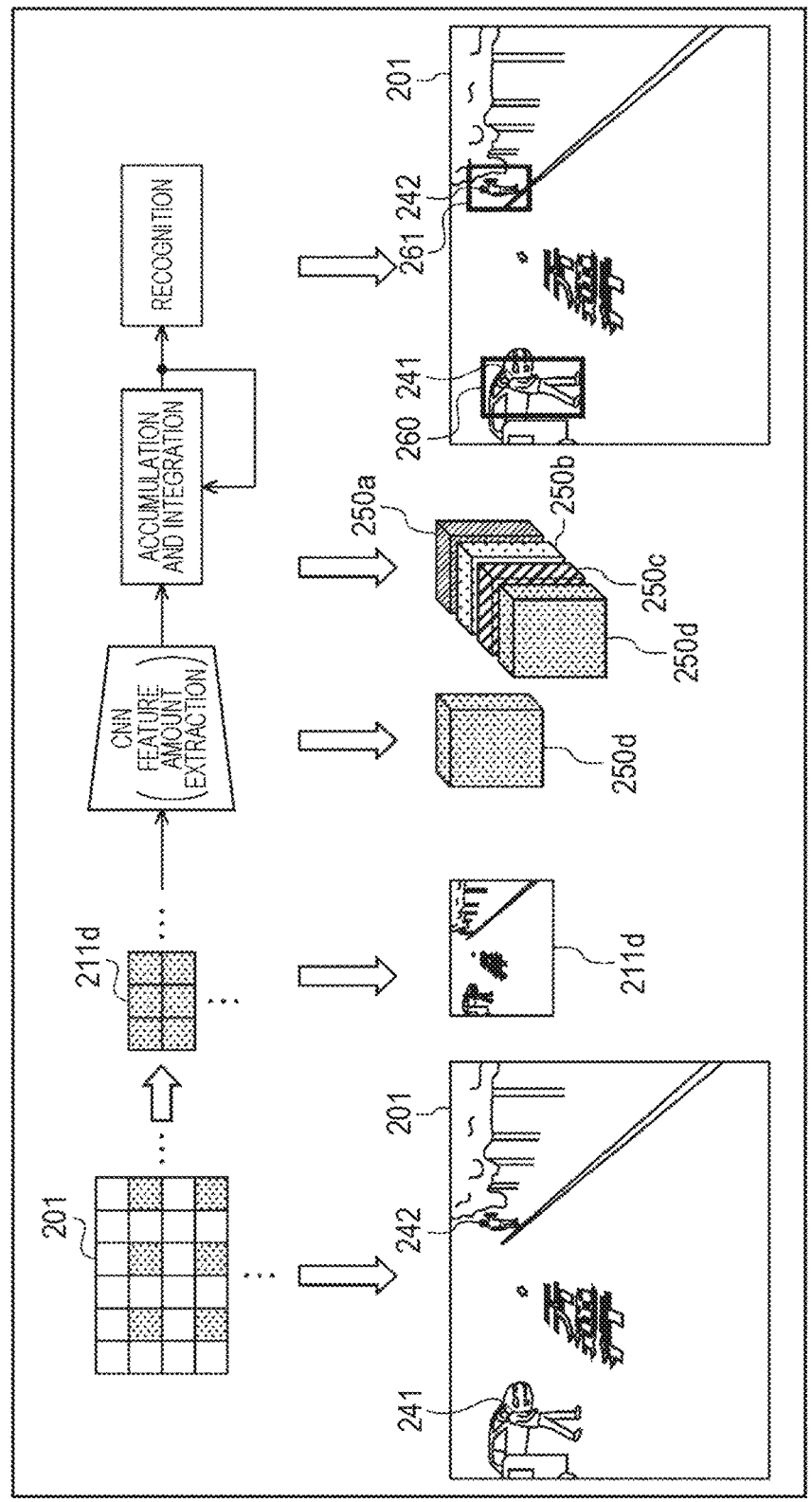
FIG. 30 is a diagram for explaining a specific example of the recognition processing using the DNN.
Figure 31:
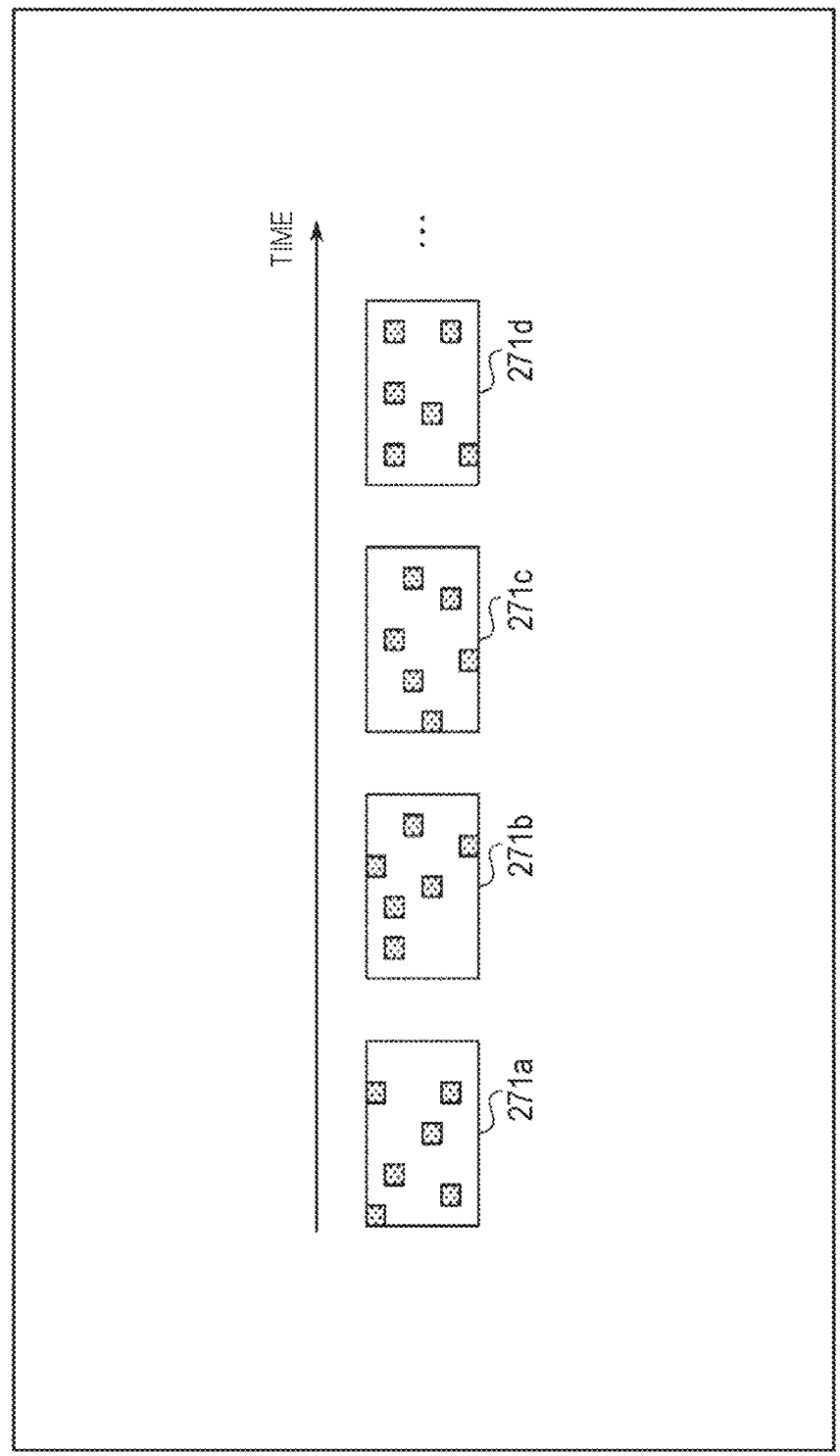
FIG. 31 is a diagram for explaining a method of selecting a pixel position in a subsampled image.

At a time T+3 after a lapse of a predetermined time from the time T+2, as illustrated in FIG. 30, a subsampled image 211d generated by subsampling a pixel at a predetermined pixel position with respect to the complete data image 201 is input to the image processing unit 82.

The subsampled image 211d corresponds to, for example, an image obtained by sampling a lower right pixel of each 2×2 pixel unit of the complete data image 201. In other words, the subsampled image 211d corresponds to an image obtained by sampling each pixel position shifted in the horizontal direction by one pixel with respect to the pixel position of the subsampled image 211c of the image 201.

The image processing unit 82 extracts a feature amount 250d of the input subsampled image 211d by using the CNN. The image processing unit 82 accumulates the extracted feature amount 250d in the accumulation unit. At this time, the feature amounts 250a to 250c extracted respectively from the subsampled images 211a to 211c are already accumulated in the accumulation unit. Therefore, the image processing unit 82 accumulates the feature amount 250d in the accumulation unit, and integrates the feature amount 250d with the accumulated feature amounts 250a to 250c.

The image processing unit 82 executes the recognition processing on the basis of the feature amount in which the feature amounts 250a to 250c are integrated with the feature amount 250d. In the example of FIG. 30, the person 241 located at the medium distance is recognized and obtained as the recognition result 260, and the person 242 located at the long distance is also recognized and obtained as a recognition result 261.

By the processing of FIGS. 27 to 30, all the pixel positions of the four pixels included in the 2×2 pixel unit are selected as the pixel positions of the sampling pixels. This indicates that, in other words, all the pixels of the complete data image 201 are selected as the pixel positions of the sampling pixels.

In this way, the pixel position where the subsampled image 211 is generated is selected, and the feature amounts calculated from the individual subsampled images 211 are accumulated and integrated. As a result, the pixels included in the complete data image 201 can be gradually involved in the recognition processing, and can be recognized with higher accuracy. For example, a target object at the long distance can be easily recognized.

Note that the pixel position of the sampling pixel for generating the subsampled image 211 is not limited to the example described above. For example, a plurality of discrete and aperiodic pixel positions such as subsampled images 271a, 271b, 271c, 271d, • • • in FIG. 31 may be selected to generate a plurality of subsampled images 271.

<8. Computer Configuration Example>

The above-described series of processing executed on a satellite image or a sensor image can be executed by hardware or software. In a case where the series of processing is executed by software, a program constituting the software is installed in a computer. Here, examples of the computer include, for example, a microcomputer that is built in dedicated hardware, a general-purpose personal computer that can perform various functions by being installed with various programs, and the like.

FIG. 32 is a block diagram illustrating a configuration example of hardware of a computer that executes the above-described series of processing by a program.

In a computer, a central processing unit (CPU) 301, a read only memory (ROM) 302, and a random access memory (RAM) 303 are mutually connected by a bus 304.

An input/output interface 305 is further connected to the bus 304. To the input/output interface 305, an input unit 306, an output unit 307, a storage unit 308, a communication unit 309, and a drive 310 are connected.

The input unit 306 includes a keyboard, a mouse, a microphone, a touch panel, an input terminal, and the like. The output unit 307 includes a display, a speaker, an output terminal, and the like. The storage unit 308 includes a hard disk, a RAM disk, a nonvolatile memory, and the like. The communication unit 309 includes a network interface or the like. The drive 310 drives a removable recording medium 311 such as a magnetic disk, an optical disk, a magneto-optical disk, or a semiconductor memory.

In the computer configured as described above, the series of processes described above are performed, for example, by the CPU 301 loading a program recorded in the storage unit 308 into the RAM 303 via the input/output interface 305 and the bus 304, and executing. The RAM 303 also appropriately stores data and the like necessary for the CPU 301 to execute various processes.

The program executed by the computer (the CPU 301) can be provided by being recorded on, for example, the removable recording medium 311 as a package medium or the like. Furthermore, the program may be provided by means of a wired or wireless transmission medium such as a local region network, the Internet, and digital broadcasting.

In the computer, by attaching the removable recording medium 311 to the drive 310, the program can be installed in the storage unit 308 via the input/output interface 305. Furthermore, the program can be received by the communication unit 309 via a wired or wireless transmission medium, and installed in the storage unit 308. Besides, the program can be installed in advance in the ROM 302 and the storage unit 308.

In the present specification, the steps described in the flowcharts may be executed not only, needless to say, in time series in the described order, but also in parallel or as needed at a timing when a call is made, or the like, even if not processed in time series.

Furthermore, in the present specification, a system is intended to mean assembly of a plurality of components (devices, modules (parts) and the like) and it does not matter whether or not all the components are in the same casing. Therefore, a plurality of devices housed in separate housings and connected via a network, and a single device with a plurality of modules housed in one housing are both systems.

The embodiment of the present technology is not limited to the above-described embodiment, and various modifications can be made without departing from the scope of the present technology.

For example, the present technology may be configured as cloud computing in which a function is shared by a plurality of devices through the network to process together.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

The effects described in the present specification are merely examples and are not limited, and there may be other effects.

Note that the present technology can have the following configurations.

(1)

A ground system including:
an image processing unit configured to request transmission of additional data related to partial data from an artificial satellite to a ground station, on the basis of an analysis result of the partial data of a satellite image captured by the artificial satellite.

(2)

The ground system according to (1) above, in which
as analysis processing of the partial data, the image processing unit detects whether there is a difference between acquired partial data and partial data acquired in a past, and requests transmission from the artificial satellite described above to a ground station in a case where it is determined that there is a difference.

(3)

The ground system according to (1) above, in which
as analysis processing of the partial data, the image processing unit executes recognition processing on acquired partial data, and requests transmission of the additional data from the artificial satellite to a ground station on the basis of a result of the recognition processing.

(4)

The ground system according to (3) above, in which
the image processing unit requests transmission of the additional data from the artificial satellite to a ground station in a case where reliability of the recognition processing is low.

(5)

The ground system according to any one of (1) to (4) above, in which
the image processing unit executes additional data setting processing of setting the additional data, and requests transmission of the set additional data from the artificial satellite to a ground station.

(6)

The ground system according to any one of (1) to (5) above, in which
the image processing unit acquires the additional data from the artificial satellite, and executes data integration processing of integrating the partial data acquired first and the additional data.

(7)

The ground system according to any one of (1) to (6) above, in which
first acquisition of the partial data and acquisition of the additional data are executed in one path.

(8)

The ground system according to any one of (1) to (7) above, in which
first acquisition of the partial data and acquisition of the additional data are performed in different paths.

(9)

The ground system according to any one of (1) to (8) above, in which
the partial data is data having a low resolution, a low frame rate, or a low bit length with respect to the satellite image, and
the additional data is data having a higher resolution, a higher frame rate, or a higher bit length than the partial data.

(10)

The ground system according to any one of (1) to (9) above, in which
the partial data is data of a subsampled image generated by subsample extraction processing on the satellite image, and
the additional data is data of a subsampled image in which a pixel different from the partial data is sampled by subsample extraction processing on the satellite image.

(11)

The ground system according to any one of (1) to (10) above, in which
the partial data is information indicating a feature amount related to a predetermined recognition target.

(12)

The ground system according to any one of (1) to (11) above, in which
the satellite image is an image including an ocean as a subject, and
the image processing unit requests transmission of additional data from the artificial satellite to a ground station in response to recognition of a predetermined offshore mobile object or a predetermined offshore structure based on analysis of the partial data.

(13)

An image processing method of a ground system, the image processing method including,
by the ground system:
requesting transmission of additional data related to partial data from an artificial satellite to a ground station, on the basis of an analysis result of the partial data of a satellite image captured by the artificial satellite.

REFERENCE SIGNS LIST

1 Satellite image processing system
11 Satellite management device
13 Ground station
21 Satellite
61 Satellite communication unit
62 Image-capturing device
63 Control unit
64 Image processing unit
65 Storage unit
81 Control unit
82 Image processing unit
83 Communication unit
84 Storage unit
101 Sensor device 103 Drone
151 Sensor unit
152 Control unit
153 Storage unit
154 Transmission unit
171 Transmission device
172 Control device
173 Storage device
201 Image
211 Subsampled image
250 Feature amount
301 CPU
302 ROM
303 RAM
306 Input unit
307 Output unit
308 Storage unit
309 Communication unit
310 Drive

The invention claimed is:

1. A ground system, comprising:
an artificial satellite configured to:
  capture a satellite image;
  execute a subsample extraction process on the captured satellite image;
  generate first partial data based on the execution of the subsample extraction process, wherein
    the generated first partial data corresponds to a first subsampled image;
  generate additional data based on the execution of the subsample extraction process, wherein
    the generated additional data corresponds to a second subsampled image,
    a first pixel of the first subsampled image is sampled by the subsample extraction process,
    a second pixel of the second subsampled image is sampled by the subsample extraction process, and
    the second pixel is different from the first pixel;
a ground station; and
an image processing unit configured to:
  analyze the generated first partial data; and
  request transmission of the generated additional data from the artificial satellite to the ground station, based on a analysis result of the analysis of the generated first partial data, wherein
    the generated additional data corresponds to the generated first partial data.

2. The ground system according to claim 1, wherein the image processing unit is further configured to:
  acquire the generated first partial data;
  acquire second partial data of the captured satellite image;
  determine a difference between the acquired first partial data and the acquired second partial data; and
  request the transmission of the generated additional data based on the determined difference, and
the second partial data is acquired prior to the first partial data.

3. The ground system according to claim 1, wherein the image processing unit is further configured to:
  acquire the generated first partial data;
  execute a recognition process on the acquired first partial data; and
  request the transmission of the generated additional data based on a result of the recognition process.

4. The ground system according to claim 3, wherein the image processing unit is further configured to:
  determine a reliability of the recognition process is lower than a threshold; and
  request the transmission of the generated additional data based on the determination that the reliability of the recognition process is lower than the threshold.

5. The ground system according to claim 1, wherein the image processing unit is further configured to:
  execute an additional data setting process to set the generated additional data; and
  request the transmission of the generated additional data based on the execution of the additional data setting process.

6. The ground system according to claim 1, wherein the image processing unit is further configured to:
  acquire the generated first partial data;
  acquire the generated additional data from the artificial satellite; and
  execute a data integration process of integration of the acquired first partial data and the acquired additional data, and
the generated first partial data is acquired prior to the generated additional data.

7. The ground system according to claim 1, wherein the image processing unit is further configured to acquire the generated first partial data and the generated additional data in one path, and
the generated first partial data is acquired prior to the generated additional data.

8. The ground system according to claim 1, wherein the image processing unit is further configured to acquire the generated first partial data and the generated additional data in different paths, and
the generated first partial data is acquired prior to the generated additional data.

9. The ground system according to claim 1, wherein
the generated first partial data has one of a lower resolution, a lower frame rate, or a lower bit length with respect to the captured satellite image, and
the generated additional data has one of a higher resolution, a higher frame rate, or a higher bit length than the generated first partial data.

10. The ground system according to claim 1, wherein the generated first partial data is information indicating a feature amount corresponding to a specific recognition target.

11. The ground system according to claim 1, wherein the captured satellite image includes an ocean as a subject, and
the image processing unit is further configured to:
  recognize at least one of a specific offshore mobile object or a specific offshore structure in the ocean; and
  request the transmission of the generated additional data based on the recognition.

12. An image processing method comprising:
in a ground system that includes an artificial satellite, a ground station, and an image processing unit:
capturing, by the artificial satellite, a satellite image;
executing, by the artificial satellite, a subsample extraction process on the captured satellite image;
generating, by the artificial satellite, first partial data based on the execution of the subsample extraction process, wherein
  the generated first partial data corresponds to a first subsampled image;
generating, by the artificial satellite, additional data based on the execution of the subsample extraction process, wherein the generated additional data corresponds to a second subsampled image,
a first pixel of the first subsampled image is sampled by the subsample extraction process,
a second pixel of the second subsampled image is sampled by the subsample extraction process, and
the second pixel is different from the first pixel;
analyzing, by the image processing unit, the generated first partial data; and
requesting, by the image processing unit, transmission of the generated additional data from the artificial satellite to the ground station, based on a analysis result of the analysis of the generated first partial data, wherein
the generated additional data corresponds to the generated first partial data.

13. A ground system, comprising:
an artificial satellite configured to capture a satellite image;
a ground station; and
an image processing unit configured to:
acquire first partial data of the captured satellite image;
acquire second partial data of the captured satellite image;
determine a difference between the acquired first partial data and the acquired second partial data; and
request transmission of additional data from the artificial satellite to the ground station, based on the determined difference, wherein
the second partial data is acquired prior to the first partial data, and
the additional data corresponds to the acquired first partial data.

* * * * *